United States Patent
Urien

(10) Patent No.: US 6,735,627 B2
(45) Date of Patent: May 11, 2004

(54) SYSTEM AND METHOD OF SMART CARD FOR MANAGING TRANSMISSIONS OF MULTIMEDIA DATA VIA AN INTERNET-TYPE NETWORK, IN PARTICULAR TELEPHONE OR VIDEOPHONE DATA, BETWEEN SUBSCRIBER SYSTEMS

(75) Inventor: Pascal Urien, Villepreux (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/958,791

(22) PCT Filed: Feb. 9, 2001

(86) PCT No.: PCT/FR01/00395

§ 371 (c)(1), (2), (4) Date: Oct. 10, 2001

(87) PCT Pub. No.: WO01/60018

PCT Pub. Date: Aug. 16, 2001

(65) Prior Publication Data

US 2003/0086542 A1 May 8, 2003

(30) Foreign Application Priority Data

Feb. 10, 2000 (FR) .............................................. 00 01663

(51) Int. Cl.⁷ .......................................... G06F 15/173
(52) U.S. Cl. ...................................... 709/223; 709/218
(58) Field of Search ......................... 709/206, 218–219, 709/220, 224, 226, 227, 223; 707/9; 710/33

(56) References Cited

U.S. PATENT DOCUMENTS 5,734,831 A * 3/1998 Sanders ....................... 709/226
6,253,203 B1 * 6/2001 O'Flaherty et al. ............ 707/9
6,366,967 B1 * 4/2002 Wagner ......................... 710/33
6,481,621 B1 * 11/2002 Herrendoerfer et al. .... 235/380

FOREIGN PATENT DOCUMENTS

FR 2 760 159 A 8/1998
WO WO 98 57474 A 12/1998

* cited by examiner

Primary Examiner—Hosain Alam
Assistant Examiner—Philip B. Tran
(74) Attorney, Agent, or Firm—Miles & Stockbridge P.C.; Edward J. Kondracki

(57) ABSTRACT

The invention relates to a method for managing data transmissions via an internet network (RI) between calling (Aa) and called (Ab) subscribers and also an associated smart card. A card (2a) cooperates with a terminal (1a) and has client/webserver ($S_{WEB}$), CGI and proxy (27a) functions. The proxy function is used for the signaling channels (CS) and data channels (CD). The terminal (1a) and the card (2a) include specific communication protocol layers that make it possible to establish sessions for bidirectional transmission between them and/or with the internet network (RI). The smart card (2a) stores applications associated with protocols for listing (900a) and for locating subscribers (901a), as well as subscriber profiles (903a). It plays the role of a proxy in the signaling channel (CS) and/or data channel (CD).

17 Claims, 10 Drawing Sheets

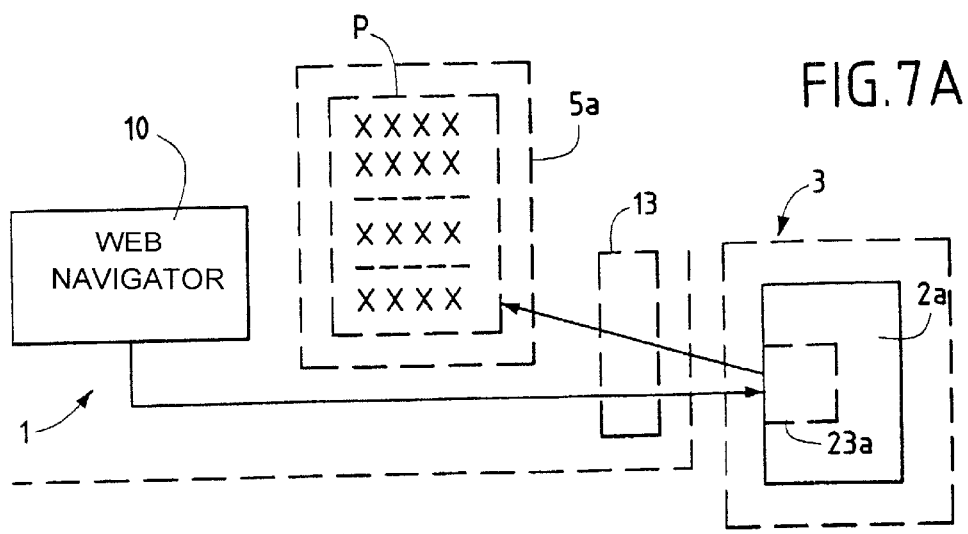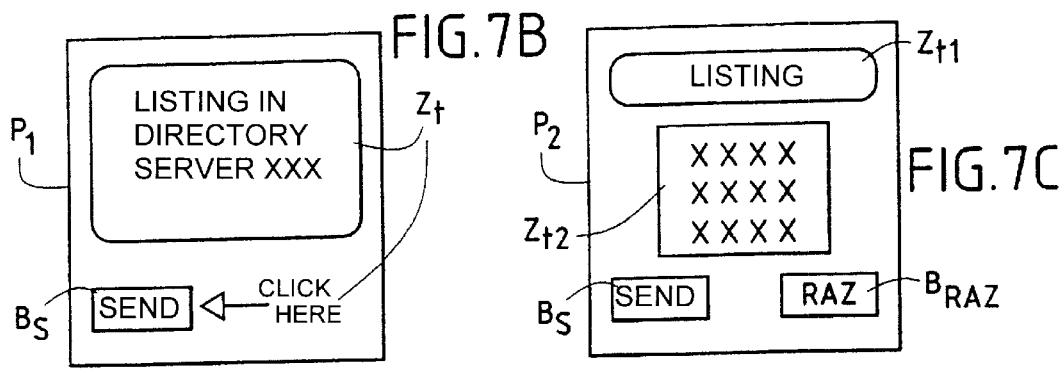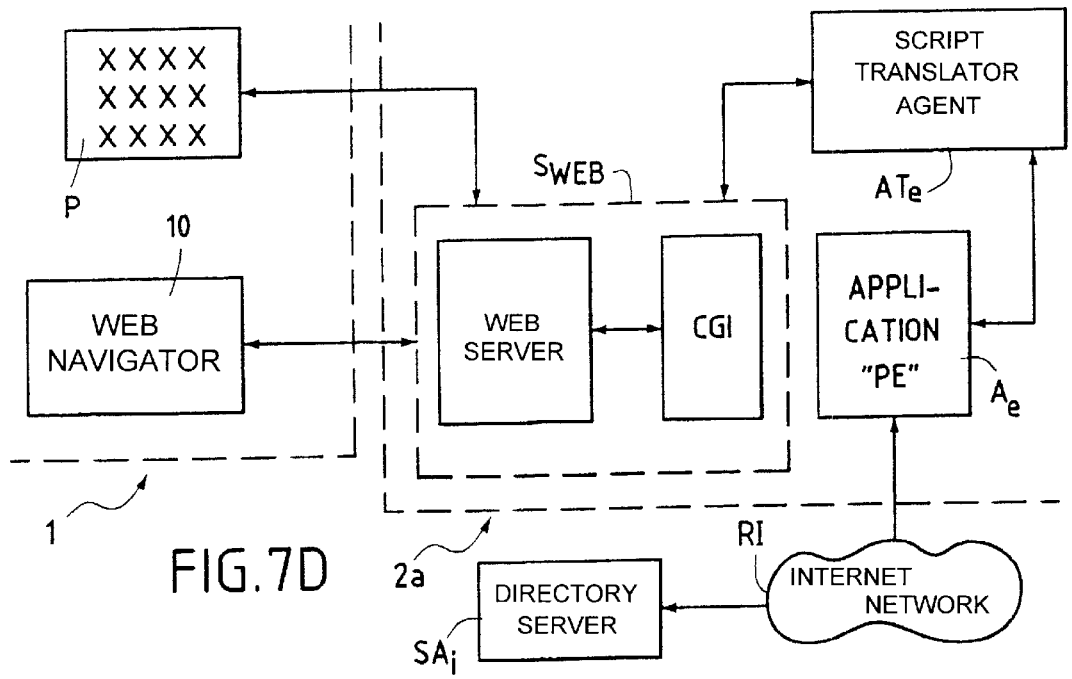

SYSTEM AND METHOD OF SMART CARD FOR MANAGING TRANSMISSIONS OF MULTIMEDIA DATA VIA AN INTERNET-TYPE NETWORK, IN PARTICULAR TELEPHONE OR VIDEOPHONE DATA, BETWEEN SUBSCRIBER SYSTEMS

CROSS REFERENCE TO RELATED APPLICATIONS

The subject matter of this invention is related to application Ser. No. 09/958,724, filed Oct. 10, 2001, in the name of Pascal URIEN, entitled "METHOD FOR LISTING A USER IN A DIRECTORY SERVER OF AN INTERNET-TYPE NETWORK AND/OR LOCATING A USER IN THIS NETWORK, AND SMART CARD FOR PERFORMING THE METHOD" and assigned to the assignee of the present invention; application Ser. No. 09/958,726, filed Oct. 10, 2001, in the names of Alain BOUDOU, Pascal URIEN and Christoph SIEGELIN, entitled "METHOD FOR LOADING A PIECE OF SOFTWARE IN A SMART CARD, IN PARTICULAR OF THE TYPE KNOWN AS AN 'APPLET'" and assigned to the assignee of the present invention; and application Ser. No. 09/958,725, filed Oct. 10, 2001, in the name of Pascal URIEN, entitled "METHOD FOR HIGH SPEED DATA STREAM TRANSMISSION TO AN INTERNET-TYPE NETWORK BETWEEN A SERVER AND A SMART CARD TERMINAL, IN PARTICULAR A MULTIMEDIA DATA STREAM'" and assigned to the assignee of the present invention . . . The subject matter of said applications is hereby incorporated by reference.

FIELD OF THE INVENTION

The invention relates to a method for managing transmissions of multimedia data via an internet-type network with the aid of smart cards connected to terminals provided with a smart card reader.

The invention relates more particularly to the management of telephone or videophone transmissions via an internet-type network.

The invention also relates to a smart card for implementing this method.

The aforementioned transmissions can be done either entirely on the internet-type network or partly over this network and partly over a standard telephone network (for instance of the switched type), via a hardware gateway and suitable software.

BACKGROUND OF THE INVENTION

To define the concepts, and without in any way limiting the scope of the invention, the method will be described in the context of the preferred application, that is, telephone calling via an internet network. Within the scope of the invention, the term "internet network" must be understood in its most general sense. Besides the internet itself, it pertains to private business networks or the like of the type known as "intranet", and networks extending them to the outside, of the type known as "extranet", and in general any network in which data exchanges are done in accordance with an internet-type protocol. In the following description, such a network will be generically called an "internet network".

The term "terminal" must also be understood in a general sense. The aforementioned terminal can in particular comprise a personal computer operating under various operating systems, such as Windows or UNIX (both of these being registered trademarks). It can also comprise a workstation, portable computer, or dedicated card terminal.

Given the spectacular development of the internet network in the last five years, an increasing number of terminals are connected to this network, especially for the sake of being linked to remote servers of the web type. There are limitations in terms of the data traveling over these links that make up the web of the internet network. However, these limitations are not primarily linked to the nature of the data but instead to the speed that these links allow. The recent installation of high-speed links (cable, ASDL, satellite links, ISDN, etc.) nevertheless make it possible to carry data of the multimedia type and to process these data in real time.

It is also of particular interest to have telephone communications, even videophone communications, travel over the internet network. Transmitting the data themselves does not present any particular problems. They can be processed by the protocols typically used on this type of network. The management of the communications, however, does present specific problems, especially problems associated with what in conventional telephony is called "signaling". In general, this concept designates such operations as calling a correspondent, accepting a call, beginning and ending a conversation, ringing, disconnection, etc.

In the 1990s, a great many systems and types of software for making telephone calls via the internet network have been proposed.

The first telephone for the internet, called "Internet Phone" (registered trademark), was developed by the company known as Vocaltec in 1995. By now, dozens of products are known: "WebPhone", "NetMeeting" put out by Microsoft (both of these are registered trademarks), and so forth.

The resultant state of the art is accordingly distinguished by great diversity and a lack of standards, or at least de facto standards. It follows that these products are not interoperable.

However, the following current trends can be observed:

a) use of a port of the TCP type to achieve pseudo-signaling (notification of a call, identification of the caller for the sake of accepting or rejecting the call, etc.);

b) compression of the audio signal, for instance using the method known as UIT-T G723 (Union Internationale des Télécommunications) from 5.3 kbps to 6.3 kbps;

c) broadcasting sound using the RTP protocol (Real Time Protocol), meeting the specification RFC 1889, which it in turn uses the UDP transmission protocol (for User Datagram Protocol) and dated pdus (for Protocol Data Units), and which is associated with RTCP control protocol (for Real Time Transport Control Protocol); and d) identifying the called party by its IP address, where numerous servers make it possible to assign, to a fixed mail address, an IP address issued by a PPP server of a service provider (ISP, for Internet Service Provider), such as a server known by the symbol ICQ for example.

When communications must leave the internet network, internet telephony gateways or ITGs make it possible to connect a public switched telephone network or RTC, known in English as PSTN. The H323 protocol which defines the format of packets used in local networks and in an ISDN network seems to be becoming the dominant standard for call control protocols or CCPs.

Internet telephony presents three main types of problems:

a) locating the subscriber in the network, that is, establishing a relationship between an IP address (of an information processing machine) and the subscriber;

b) managing the signaling of a telephone call (calling the correspondent, acceptance of the call, beginning of a conversation, end of a conversation): this function is performed by what is called a proprietary protocol (generally called a proprietary signaling protocol or PSP) for calls of the internet/internet type, or by a particular protocol (the aforementioned CCP) that is coming to be the standard for calls of the internet/PSTN type, the signaling being done by means of a TCP connection which will hereinafter be called the signaling channel or CS; and c) the exchange of a multimedia data stream: The protocol adopted is generally the protocol known as RTP (for real time protocol, corresponding to the aforementioned specification RFC 1889), and the exchange of multimedia data is done through a data channel, while the information is transported by the aforementioned UDP protocol.

To make a telephone conversation on the internet, the caller and the called party must both use the same software. FIG. 1 schematically illustrates the main modules that make up telephony software (LT), such as the "NetMeeting" software mentioned above. Schematically, a conventional telephony software and the architecture of the associated transmission system include the following subassemblies:

a) a subscriber profile (PA), which contains a set of information making it possible to identify a subscriber;

b) a listing protocol (PE) which performs the listing of a subscriber in a directory server (SA—identified by a particular port number or TCP, such as port No. 389);

c) a locating protocol (PL), which performs the function of looking up a subscriber on the basis of this identifier (in general, e-mail), this function being implemented by means of a connection to the directory server (SA);

d) a signaling channel (CS), which employs a proprietary signaling protocol (PSP), which manages a telephone call through a TCP connection to a particular port (No. 1503 for NetMeeting); and e) a data channel (CD), which manages the exchange of data in real time (sound and/or images) with the aid of a data exchange protocol, such as RTP.

Optionally, the internet telephony software can send a call to a subscriber of the standard telephone network, using a call control protocol (CCP), by means of a TCP connection (to port No. 1731, in the case of the "NetMeeting" software).

FIG. 1 accompanying the present description schematically illustrates the architecture of a telephony system 9 via the internet network RI, according to the prior art, and using telephony software of the type that has just been described.

In this figure, two terminals 9a and 9b have been shown schematically, reduced only to the telephony software with which they are equipped, 90a and 90b, respectively.

The components of these types of software include one listing protocol PE 900a and 900b for each terminal 9a and 9b, respectively, associated with a respective subscriber profile (PA) 903a and 903b and a locating protocol PL, 901a and 901b, respectively. A subscriber profile PA includes a basic identifier of a subscriber, Aa or Ab, generally known as a "UserID", and various data which will be specified hereinafter that identify this subscriber more completely.

The listing protocol PE, 900a or 900b, enables the subscribers Aa and Ab associated with the terminals 9a and 9b, respectively, to list themselves in a directory server 91 connected to the internet network RI. The listings are done using identification data contained in the aforementioned subscriber profiles PA, 903A and 903B, respectively.

When one wishes to make a communication between two subscribers, one must first proceed to a phase of locating the called subscriber. For instance, if the terminal 9a is to be put into communication with the terminal 9b, then the IP address of the terminal 9b in the internet network RI must be known.

These processes per se are common to conventional telephony in a purely switched network. A call number is assigned to each subscriber, and this number is listed in one or more directories.

However, using an internet network to telephone transmissions between subscribers, or even between terminals, imposes specific constraints.

First, it would appear useful to briefly recall the main characteristics of the protocols for communication over networks.

The architecture of communication networks is described by various layers. By way of example, the OSI standard (for Open System Interconnection) defined by the ISO includes seven layers, which range from what are known as lower layers (such as the "physical" layer, which involves the physical transmission substrate) to what are known as high, or upper, layers (such as the "application" layer), passing through intermediate layers, especially the "transport" layer. A given layer offers its services to the layer that is immediately above it, and requests other services, via suitable interfaces, from the layer that is immediately below it. The layers communicate with the aid of primitives. They can also communicate with layers of the same level. In certain architectures, various layers may not be present.

In an environment of the internet type, the layers are five in number, and more precisely, ranging from the highest to the lowest layer, they are: the application layer ("http", "ftp", "e-mail", etc.), the transport layer ("TCP"), the network addressing layer ("IP"), the data link layer ("PPP", "Slip", etc.), and the physical layer.

In the prior art, the subscribers Aa and Ab use internet terminals 9a or 9b, which have a fixed IP address or a variable one when an internet service provider or ISP is used.

A first disadvantage is the fact that an IP address is not associated with a subscriber but rather with an information processing system connected to the internet network. Even in the case where the information processing system is provided with a fixed address, there is no correspondence a priori between an IP address and a physical person. In a practical sense, to establish such a relationship, the subscriber makes a connection with the directory server SA 91 (which can for example be of the IRC type, for Internet Relay Chat). This server associates the IP address of the subscriber to the subscriber identifier or UserID. The identifier is generally his e-mail address, but an arbitrary pseudonym can also be used.

This association is generally not authenticated, so that the service (typically free) can be used as conveniently as possible. However, this arrangement is not exempt from disadvantages, especially for what called "sensitive" applications.

One of the first constraints encountered is accordingly to locate a subscriber in the internet network RI, that is, to establish a correspondence between a fixed identifier and an IP address.

Locating a subscriber on the internet network RI, that is, establishing the aforementioned correspondence, presupposes that the subscriber was already listed in the directory server SA.

The address of the subscriber in the internet network accordingly comprises a pair: address SA and UserID. In the usual way, the term "subscriber" means a "physical" entity. By extension, it can be a function. However, hereinafter, "subscriber" will be used in its common sense, without in any way limiting the scope of the invention.

In practical terms, a subscriber indicates his location in the internet network RI by a voluntary act, by furnishing the (directory) server his current IP address, using the aforementioned listing protocol PE.

This operation requires that the terminal 9a or 9b have a specific (or applications) software, issued by the service provider, in this case the software PE, 900a or 900b, and personalized with a particular subscriber profile PA, 903a or 903b.

As has been indicated, besides the basic identifier for the subscriber (UserID), the subscriber profile PA, 103a or 103b, includes a set of information furnished to the directory server SA 91 at the time the subscriber was listed, for example:

the address of the directory server (SA);
the subscribers (identified by their UserIDs) with which the user is willing to enter into communication, or to whom he wants to notify his location in the network; and
the information that he is willing to make public in the directory server (such as name, nationality, contacts sought, and so forth). To contact a correspondent through the internet network RI, this correspondent being duly listed, it is necessary to know his IP address. This information is obtained using the directory server SA 91 and the locating protocol PL, 901a or 901b, respectively.

It should be noted that the subscriber profile PA is by its nature specific to the subscriber, but it can also depend on characteristics of the directory server SA, especially the type and nature of the information that must be furnished to him or that he can accept.

It should finally be noted that the PL protocol 901a or 901b, like the PE protocol 900a or 900b, is proprietary, since it addresses a directory server SA 91 that is a priori non-standardized or does not meet universally recognized standards. The PE and PL protocols of terminals must be compatible with the corresponding protocols in the directory server SA 91, 910 and 911, respectively.

These two characteristics represent additional disadvantages.

To summarize the above review, if a calling subscriber PA is to be able to locate a called subscriber Ab and be located by the latter in turn, the terminal he uses, such as 9a, must store specific software 900a or 900b, 901a or 901b, which make it possible to use the PE and PL protocols. It must also be necessary for the terminal to store data pertaining to its subscriber profile PA 903a. This comment applies similarly to the terminals of other subscribers, such as the terminal 9b.

In other words, the terminal 9a or 9b used by an arbitrary subscriber Aa or Ab is also specific, in the sense that if this subscriber wishes to change terminals he must, in the new terminal used, retrieve at least the software or programs associated with the PL protocol, by acknowledging that he had performed a preliminary listing phase in the first terminal by calling the protocol PE and by furnishing his profile PA to the directory server SA. In fact, the presence of the protocol PL is necessary in order to address the directory server SA 91 and to have access to the data recorded in it, in particular the IP addresses of the correspondence sought and their profiles PA.

The terminals 9a or 9b must also be provided each with two additional programs, also of proprietary type: the signaling protocol PSP, 902a or 902b, and the data exchange protocol RTP mentioned above (or a similar protocol), 905a or 905b. The modules associated with the PSP protocol correspond with one another by way of the signaling channel CS, through the internet network RI. In the same way, the modules associated with the RTP protocol correspond with one another by way of the data channel CD, through the internet network RI.

Finally, if the telephone communications must depart from the internet network RI to the standard switched network 93, it is necessary to provide the aforementioned call control protocol or CCP mentioned above (or a similar protocol), 904a or 904b, which is also proprietary. It is also necessary to provide one or more gateways of the ITG type mentioned above, represented by the unique reference numeral 92, between the module 904a associated with the CCP protocol, and the PSTN network 93. A subscriber telephone 95 communicates with the PSTN via a central conventional PBX 94, or any similar system. The communications between the gateway ITG 92 and the subscriber terminal, 9a in the example shown in FIG. 1, employ a TCP type of connection. This communications in the switched telephone network portion are done in the conventional way and there is no need to describe them again here.

It would accordingly be valuable to use non-standardized terminals to perform the phases of listing and especially of locating subscribers on the internet network RI, as well as signaling (calling the subscriber located, and so forth) and exchanging data, which would make it conveniently possible to achieve the concept called "nomadism".

It would also be valuable to be able, in the signaling phase, to use a procedure for simple or mutual secure identification between the called party and the caller. Various negotiations, such as negotiations of encryption keys or operations called "reservation" or routing paths, would also have to be capable of being done at the time of this signaling phase. In addition, in the data exchange phase, it would be valuable to be able to assure robust encryption/decryption of information, based for instance on the encryption keys negotiated beforehand. Finally, it would be valuable to be able to use pricing based on the quantity (rate) of data exchanged and/or on the quality of the routing paths put at one's disposal, these paths having been negotiated for instance in the preceding signaling phase.

The programs associated with the aforementioned protocols PE and PL do not typically require having a large amount of memory available. The same is true for the profile data PA. Hence it is possible to conceive of recording them entirely or in part in the memory circuits of a smart card, which current technology does allow.

However, this involves a dual technical difficulty, as will be shown hereinafter, which prevents any direct communication between the internet network RI and a smart card.

First, the general architecture of a smart card-based applications system will be reviewed briefly, with reference to FIGS. 2A and 2B.

A smart card-based applications system can generally include the following main elements:

a smart card;
a host system comprising the aforementioned terminal;
a communications network, that is, the internet in the preferred application;
and an applications server connected to the internet.

FIG. 2A schematically illustrates one example of this type of architecture. The terminal 1, such as an individual computer, includes a reader 3 for a smart card 2. This reader 3 may or may not be physically integrated with the terminal 1. In the context of the invention, the terminal 1 plays the role of the terminals 9a or 9b of the system of FIG. 1. The smart card 2 includes an integrated circuit 20 whose input/output connections are flush with the surface of its substrate, to allow a supply of electrical energy and communications with the terminal 1. This terminal includes circuits 11 for access to the internet RI. These circuits can be constituted by a modem for connection to a switched telephone line or a higher-speed communication path, such as the Integrated Service Digital Network (ISDN), cable, or satellite links. The circuits 11 enable connection to the internet RI, either directly or via an internet service provider (ISP). Recourse can also be had to an intermediate system such as a proxy or an insulation system known as a firewall (or guard barrier).

The terminal 1 naturally includes all the circuits and devices necessary for its proper functioning, which have not been shown for the sake of simplifying the drawing: a CPU, random access and read-only memories, magnetic disk mass memory, disk drive and/or CD-ROM drive, and so forth.

Typically, the terminal 1 is also connected to conventional peripherals, either integrated or not, such as a display screen 5, a keyboard 6a and a mouse 6b, and 2 so forth.

The terminal 1 can be put into communication with servers or any information processing systems connected to the network RI, of which a single server 4 is shown in FIG. 2A. In the context of the invention, the server 4 comprises a directory server 91 (FIG. 1) and the terminal 1 comprises on of the systems 9a or 9b associated with a subscriber Aa or Ab. The access circuits 11 put the terminal 1 into communication with the servers 4 using a particular software 10, called a web navigator or browser. This enables access to various applications or data files that are distributed over the entire network RI, generally by a client-server mode, and in particular enables access to multimedia files.

The communication protocol for the internet network RI is selected as a function of the particular application contemplated, such as looking up web pages, transferring files, electronic mail (or e-mail), forums, news, etc.

The software architecture of the system including a terminal, a smart card reader and a smart card, is shown schematically in FIG. 2B. It is described by ISO standard 7816, which in turn includes several subsets:

ISO 7816-1 and 7816-2, pertaining to the dimensions and marking of cards;

ISO 7816-3, pertaining to the transfer of data between the terminal and the smart card; and ISO 7816-4, pertaining to the structure of the set of orders and the format of commands.

In FIG. 2B, for terminal 1, only the layers meeting ISO standard 7816-3, identified by reference numeral 101, and an APDU order manager (ISO 7816-4), reference numeral 102 are shown. For the smart card 2, the layers meeting ISO 7816-3 are identified by reference numeral 200, and the ADPU order manager (ISO 7816-4) has reference numeral 201. The applications carry reference symbols $A_1, \ldots A_i, \ldots A_n$, where n is the maximum number of applications present in the smart card 2.

An application $A_i$ in the smart card 2 (FIG. 1A) conducts a dialog with the terminal 1 by means of a set of orders. This set typically has writing and reading orders. The order format is known by the abbreviation APDU ("Application Protocol Data Unit"). It is defined by the aforementioned ISO standard 7816-4. A command APDU is written as "APDU.command", and a response APDU is written "APDU.response". The APDUs are exchanged between the card reader and the smart card by means of a protocol specified by the aforementioned ISO standard 7816-3 (for example, in the character mode: T=0; or in the block mode: T=1).

When the smart card 2 includes a plurality of distinct applications, as illustrated by FIG. 2B, it is called a multi-application card. However, the terminal 1 is in a dialog with only one application at a time.

The selection of a particular application $A_i$ is obtained with the aid of an APDU of the selection type ("SELECT"). Once this choice has been made, the APDUs that follow are routed through this application. A new "APDU SELECT" causes the current application to be abandoned so that another one is then chosen. The software manager subset of the APDUs 201 makes it possible to choose a particular application $A_i$ in the smart card 2, to memorize the application thus chosen, and to transmit and/or receive APDUs to and from this application.

To summarize what has just been described, the selection of an application $A_i$ and dialog with it are done by exchanges of APDU orders. Let it be assumed that the applications $A_i$ are conventional applications, hereinafter called GCAs (for Generic Card Application).

Given the above review, it should be noted that the smart card 2 cannot communicate directly with standard commercial navigators except by modifying their code.

Furthermore and above all, current smart cards, which moreover meet the standards described above, have a hardware and software configuration that no longer allows them to communicate directly with the internet. In particular, they cannot receive and transmit data packets by one or the other of the protocols used in this type of network. Hence it is necessary to provide an additional item of software, implanted in the terminal 1, generally in the form known as a "plug-in". This item of software, which is identified by reference numeral 12 in FIG. 2A, acts as the interface between the navigator 10 and the card 2, and more specifically the electronic circuits 20 in this card 2.

SUMMARY OF THE INVENTION

The invention seeks to overcame the disadvantages of the methods and apparatus of the prior art, some of which have just been recalled, while meeting the needs that result.

According to the invention, the applications required for implementing the listing and locating protocols PE and PL, like the data characterizing the subscriber profile PA, are files that are preferably stored, entirely or in part, in the memories of a smart card, the executable files being standard applications of the aforementioned GCA type.

According to the invention, the smart card behaves like a webserver/client with regard to the terminal with which it is associated.

To attain this object, a specific communication protocol layer is provided in the smart card and its counterpart in the terminal. The term "specific" must be understood to mean specific to the method of the invention. In fact, these communication layers, called specific communication layers, are non-specialized, regardless of the application in question. In particular, they are independent of the applications necessary for using the PE and PL protocols. They act only in the process of bidirectional data exchanges between the smart card and the terminal on the one hand, and the smart card and the network, on the other.

The specific communication software layer, known as "intelligent agents", make it possible in particular to convert protocols. The intelligent agents will hereinafter be called simply "agents". There are matched agents in the specific communication layers assigned to the terminal and the smart card, respectively. By the method of the invention, sessions between matched agents are established.

It will be noted that the method of the invention makes it possible to activate applications of a conventional type, that is, of the aforementioned GCA type, that are located in a smart card, without having to modify them in any way.

To do so, one or more particular intelligent agents called script translators are provided, which receive requests from a navigator and translate them into APDU orders that can be understood by the GCA application. In this way, a function similar to that also known as "CGI" in conventional webservers is implanted into the smart card. This function makes it possible to implement an application in the smart card using an internet protocol of the HTTP type.

These various applications enable the smart card, and more precisely the applications present in it, to communicate directly with a remote server connected to the internet network by using protocols of the internet type. The CGI function offered by the smart card for its part makes it possible to access applications associated with the listing and locating protocols PE and PL, respectively, and executing them, without requiring the presence of applications of a proprietary type in the terminal. Only a navigator, typically of the standard commercial type, is required.

In an advantageous characteristic of the invention, a particular application, which will be called a filter hereinafter, is implanted in the smart card. This involves a software entity which plays a role similar to that of a proxy. To do so, the aforementioned arrangements employing agents are used.

This arrangement enables to smart card to behave like a signaling protocol proxy (of the TCP type) and/or a data exchange protocol proxy (of the UDP type).

The value of a signaling proxy is to be capable of using a procedure of simple or mutual authentication between the caller and the called party, which can be useful for accepting communications, for instance. It also enables the negotiation of encryption keys. It furthermore allows negotiating an optimized routing path a priori, for example by guaranteeing a given transmission quality or an increased bandwidth.

The main value of a data exchange proxy is to be able to employ a robust procedure for encryption/decryption of information. A proxy also makes it possible to use a pricing procedure, based for example on the rate or the type of path negotiated beforehand.

These characteristics are highly suitable to meeting the perceived needs described above.

Hence the main subject of the invention is a method for managing transmissions of multimedia data via an internet-type network between a first subscriber system and a second subscriber system including at least one phase of signaling data exchange, via a signaling channel, with the aid of a predetermined signaling protocol, and a phase of exchanging said multimedia data via a data channel, with the aid of a predetermined communication protocol, characterized in that at least said first subscriber system includes a terminal provided with a web-type navigator and a smart card reader that cooperate via a smart card, said smart card including a first item of software, forming a specific communication protocol layer, and said terminal including a second item of software, forming a specific communication protocol layer and forming an interface with at least said web-type navigator; said first and second items of software further include at least a first autonomous software entity of the client type and a second autonomous software entity of the server type, said entities cooperating in such a way as to enable to establishment of bidirectional data exchange sessions between said terminal and said smart card, and that said smart card offers the function of a client/web server, and to enable to establishment of a bidirectional data exchange between the terminal of said first subscriber system and said second subscriber system via said internet-type network, said autonomous software entities communicating by means of predetermined protocol data units;

that it includes the embodiment, in said smart card, of an item of applications software of predetermined functional characteristics, known as a filter, which receives and/or sends protocol data units to and/or from said first and second autonomous software entities of the client and server type, respectively, which are included in said second specific item of software, the embodiment of said applications item being under the control of said autonomous software entity of the server type; and that said filter cooperates with said autonomous software entities of said second specific item of software to open a session with said autonomous software entities of said first specific item of software in order to form a function known as "proxy" and to control predetermined characteristics of data exchanges that pass between said first subscriber system and said second subscriber system, via at least one of said signaling channels and/or data channels, during said phases of exchanging signaling data and/or multimedia data.

The subject of the invention is also a smart card for performing this method.

BRIEF DESCRIPTION OF THE DRAWINGS

A preferred but not limiting mode for embodying the invention will now be described in more detail, in conjunction with the accompanying drawings, in which:

FIG. 7A schematically illustrates a first step of the phase of listing a subscriber in a directory server;

FIGS. 7B and 7C illustrate examples of HTML forms that can be used for this listing phase;

FIG. 7D schematically illustrates the main steps of the phase of listing a subscriber in a directory server;

DESCRIPTION OF THE PREFERRED EMBODIMENTS

The following description, without limiting the scope of the invention, will refer to the context of the preferred application of the invention, unless otherwise noted, that is, the case of telephone transmissions via the internet network.

Figure 3:
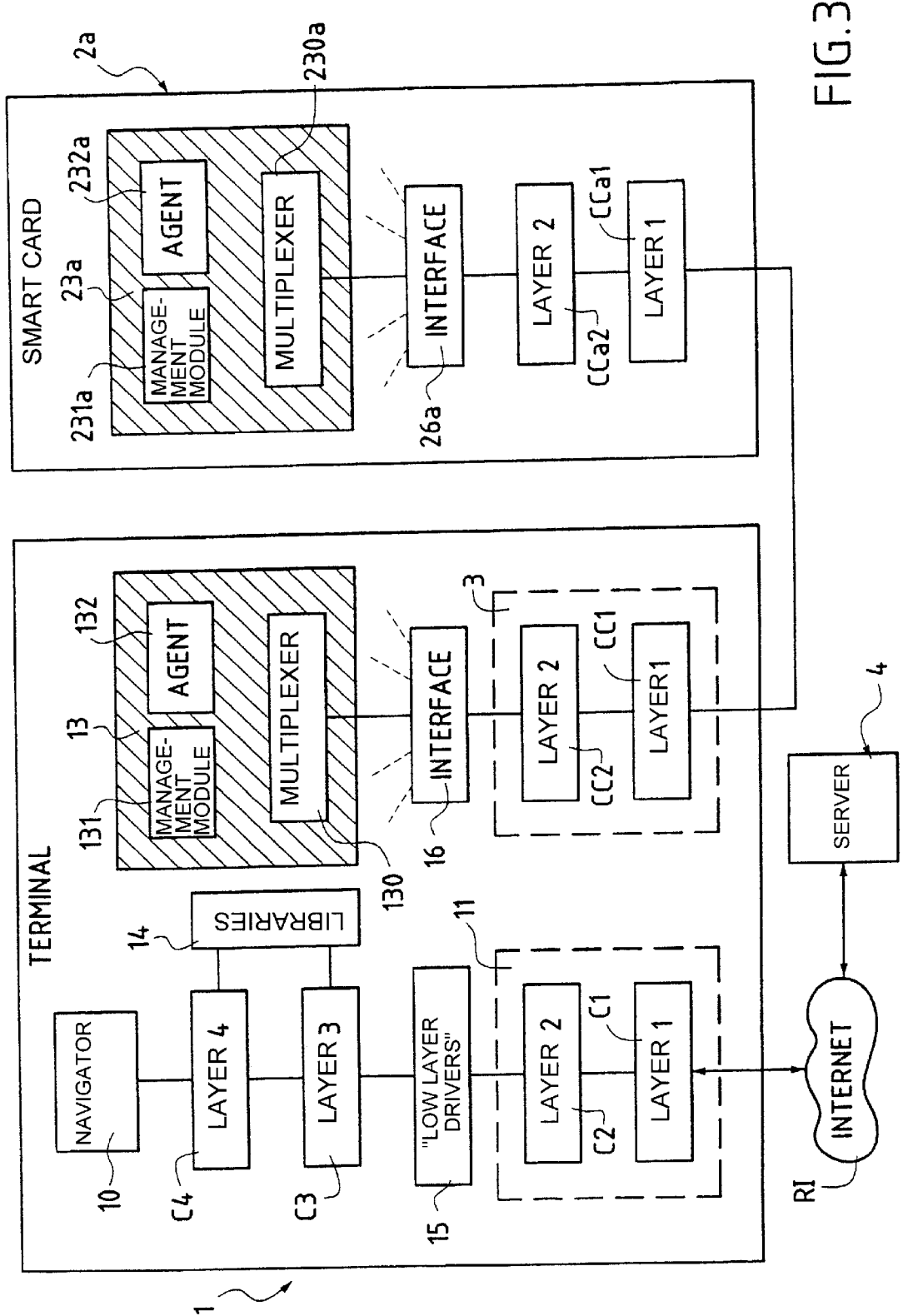
FIG. 3 schematically illustrates an example of a smart card-based applications system according to the invention, which acts as a client/webserver, according to one aspect of the invention.

FIG. 3 schematically illustrates an example of a smart card-based applications system in a first aspect of the invention, enabling the smart card to act as a client/webserver.

Figure 2A:
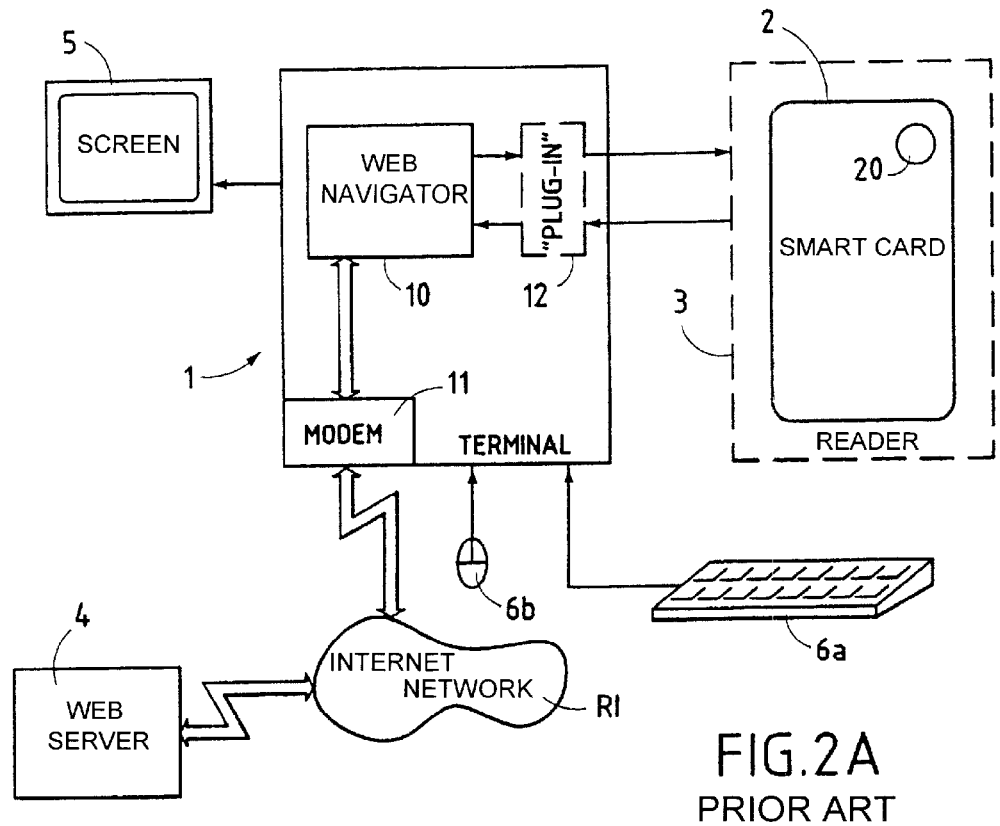
FIGS. 2A and 2B illustrate the hardware and logical architectures, respectively, of a smart card-based applications system connected to an internet network, according to the prior art.
Figure 2B:
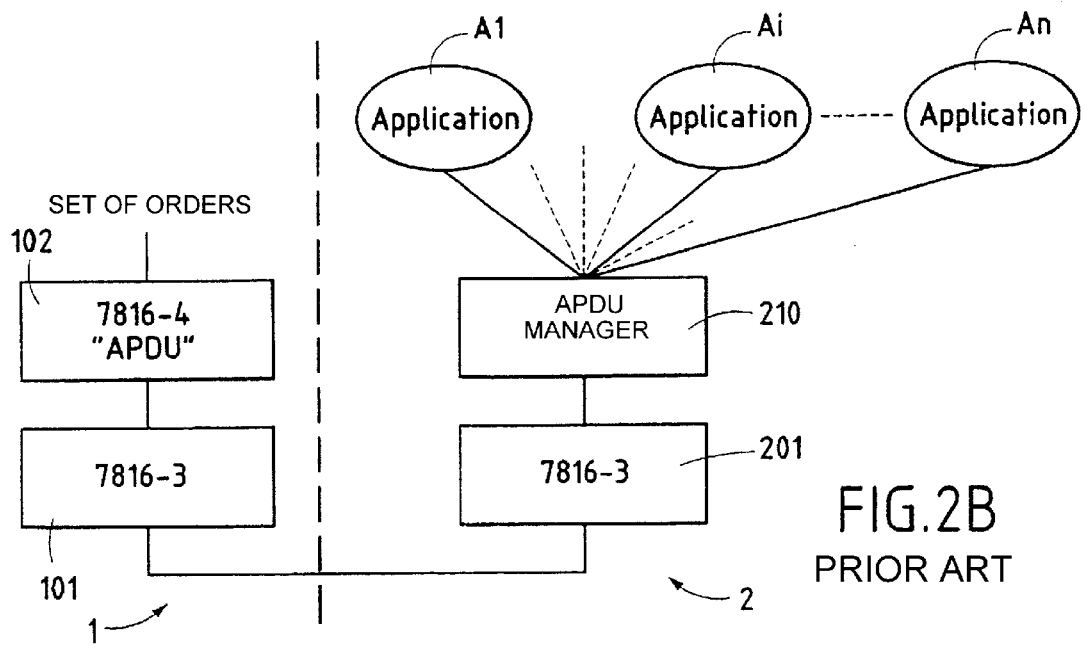

With the exception of specific communication protocol software layers 13 and 23a implanted in the terminal 1 and the smart card 2a, respectively, the other hardware and software elements are common to the prior art, especially that described above in conjunction with FIGS. 2A and 2B, and there is no need to describe them again in detail here.

The terminal 1 includes circuits 11 for access to the network RI, the circuits being constituted by a modem, for example. These circuits include the lower software layers $C_1$ and $C_2$, which correspond to the physical and data link layers.

Also shown are the upper layers $C_3$ and $C_4$, which correspond to the network addressing (IP, in the case of the internet) and transport (TCP) layers. The upper application layer ("http", "ftp", "e-mail", etc.) has not been shown.

The interface between the lower layers $C_1$ and $C_2$ and the upper layers $C_3$ and $C_4$ is made up of a software layer, generally called a "low driver layer". The upper layers $C_3$ and $C_4$ rest on this interface and are implemented by way of specific function libraries or network libraries 14, with which they correspond. In the case of the internet, TCP/IP is implemented by means of what are known as "socket" libraries.

This organization enables a navigator 10 to make requests of a server 4 to consult web pages ("HTTP" protocol) to transport files ("FTP" protocol) or to send electronic mail ("e-mail" protocol), in an entirely classical fashion.

The terminal 1 also includes a card reader 3, which may or may not be integrated. For communication with the smart card 2a, the card reader 3 also includes two low layers $CC_1$ (physical layer) and $CC_2$ (data link layer), which play a role similar to the layers $C_1$ and $C_2$. The software interfaces with the layers $CC_1$ and $CC_2$ are described for example by the PC/SC specification (part 6, service provider). The layers themselves, $CC_1$ and $CC_2$, are described in particular by ISO standards 7816-1 through 7816-4, as has been noted above.

An additional software layer 16 forms an interface between the application layers (not shown) and the lower layers $CC_1$ and $CC_2$. The main function assigned to this layer 16 is that of multiplexing/demultiplexing.

Communications with the smart card 2a are done by a paradigm similar to that used to manipulate files in an operating system of the UNIX type (UNIX is a registered trademark): OPEN, READ, WRITE, CLOSE, etc.

A similar organization is found in the smart card 2a, that is, the presence of two low layers, $CCa_1$ (physical layer) and $CCa_2$ (data link layer), as well as an interface layer 26a, which is entirely similar to the layer 16.

In accordance with the invention, two specific protocol layers 13 and 23a, respectively, are provided on one hand and other, that is, in the terminal and in the smart card 2a.

In the terminal 1, the specific layer 13 interfaces with "low driver layers" 15, libraries 14 of network layers $C_3$ and $C_4$, and protocol layers for the card reader 3, that is, the lower layers $CC_1$ and $CC_2$, via the multiplexing layer 16. The specific layer 13 enables the transfer of network packets from and to the smart card 2a. It also adapts the existing applications, such as the internet navigator 10, e-mail, etc., for uses that employ the smart card 2a.

In the smart card 2a, quite a similar organization is found, with an additional instance of the specific layer 23a, which is the counterpart of the layer 13.

More precisely, the specific layers 13 and 23a are subdivided into three main software elements:

a module 130 or 130a for transferring blocks of information between the layers 13 and 23a, via the conventional layers $CC_1$, $CC_2$, $CCa_1$, and $CCa_2$;

one or more items of software, called intelligent agents, 132 or 232a, which by way of example embody protocol conversion functions;

and a specific configuration management module 131 and 231a, respectively, which module can be likened to a particular intelligent agent.

For the sake of simplicity, these intelligent agents will be called simply agents hereinafter, as noted above.

In the terminal 1 and the smart card 2a, a communication protocol stack is found between the two entities.

The layers at level two (data link layers) $CC_2$ and $CCa_2$ assure the exchange between the smart card 2a and the terminal 1. These layers are responsible for detecting and as needed correcting transmission errors. Various protocols can be used, and by way of a non-exhaustive example, the following:

the recommendation ETSI GSM 11.1;

the protocol defined by ISO 7816-3, in character mode T=0;

the protocol defined by ISO 7816-3, in block mode T=1;

or the protocol defined by ISO standard 3309, in HDLC (High-level Data Link Control procedure) frame mode.

Within the scope of the invention, the ISO 7816-3 protocol in block mode will preferably be used.

In a manner known per se, a certain number of primitives is assigned to each protocol layer; they enable the exchanges of data between layers of the same level and from one layer to the other. By way of example, the primitives assigned to the level 2 layer are of the "data request" ("Data.request") and "send data" ("Data.response") by the card as well as "confirmation of data" ("Data.confirm"), etc.

More specifically, the layers 13 and 23a are tasked with dialog between the smart card 2a and the host, that is, the terminal 1. These layers enable the exchange of information between a user (not shown) of the terminal 1 and the smart card 2a, for example by way of scrolling menus in the form of hypertext in the HTML format. They also allow the installation of a configuration adapted for the transmission and/or reception of data packets.

As indicated above, the layers include three distinct entities.

The first layer 130 or 230a essentially comprises a software multiplexer. It enables the exchange of information between the smart card 2a and the host terminal 1, in the form of protocol data units. It plays a role similar to that of a data packet switcher. These units are sent or received via the layer at level 2 (data link layer). This particular communication protocol makes it possible to put at least one pair of agents into communication. The first agent of each pair, 132, is located in the layer 13 of the terminal 1, while the second agent, 232a, is located in the layer 23a in the smart card 2a. A link between two agents is associated with a session that will be called "S-Agent". A session is a bidirectional data exchange between these two agents. If one or the other of the layers 13 and 23a includes a plurality of agents, then the agents of the same layer can also establish sessions between them and/or with the modules 131 and 231a that constitute the particular agents.

More precisely, an agent is an autonomous software entity, which can embody all or some of the functions of layers at levels 3 and 4, depending on the configuration implemented by the terminal 1.

These agents are assigned particular properties or attributes. To define the concepts, and by way of non-limiting examples, the following six properties are assigned to the agents:

"host": agent located in the terminal;
"card": agent located in the smart card;
"local": agent not communicating with the network;
"network": agent communicating with the network (in the terminal);
"client": agent which initializes a session;
"server": agent which receives a session request.

A particular agent is identified by a reference, such as a 16-bit integer (that is, an integer between zero and 65535). The most significant bit (b15=1) tells whether this reference is local (local communications with the smart card or the terminal) or remote (b15=0).

Two large categories of agents exist: the agents of the "server" type, which are identified by a fixed reference, and the agents of the "client" type, which are identified by a variable reference that can also be called ephemeral, issued by the configuration management module 131 or 231a.

The agents communicate with one another by way of entities called protocol data units or pdus, which include a target reference and a source reference. This particular pdu can also be called a "SmartTP pdu", with reference to the currently used term "smart card". In particular, the pdus utilize the references defined above.

A SmartTP pdu, or more simply pdu hereinafter, includes a source reference, a target reference, a set of bits comprising flags, which specify the nature of the pdu, and optional data:

the "OPEN" flag is in place to indicate the opening of a session;
the "CLOSE" flag indicates the closure of a session; and
the "BLOCK" flag indicates that the agent is waiting for a response from its correspondent and has suspended all activity.

A pdu that does not include data will be called a token.

The SmartTP entity controls the existence of the target agent and performs the commutation of a packet to it.

An agent session or "S-Agent" has three notable states, specifically:

a disconnected state: no session is open with any other agent;
a connected state: a session is open with another agent, an "S-Agent" session being identified by a pair of references; and
a blocked state, where the agent is connected and is waiting for a response from its correspondent.

The mechanism for establishing an "S-Agent" session is as follows:

a new instance of a client agent is created (in the smart card or the terminal), this agent being identified by a pseudo-unique ephemeral reference;
the client agent sends a pdu to a server agent (whose reference is furthermore known) with the "OPEN" flag in place, and the client agent shifts to the connected state or the blocked state, depending on the value of the "BLOCK" flag; and
the server agent receives the pdu with the "OPEN" flag and shifts to the connected state.

Once a session is open, two agents exchange data via pdus.

The mechanism for closing a session is as follows:

one agent sends a pdu with the "CLOSE" flag in place (which may possibly include data); and
the other agent receives a pdu with the "CLOSE" flag in place (which may possible include data), and the "S-Agent" session shifts to the disconnected state.

Figure 4:
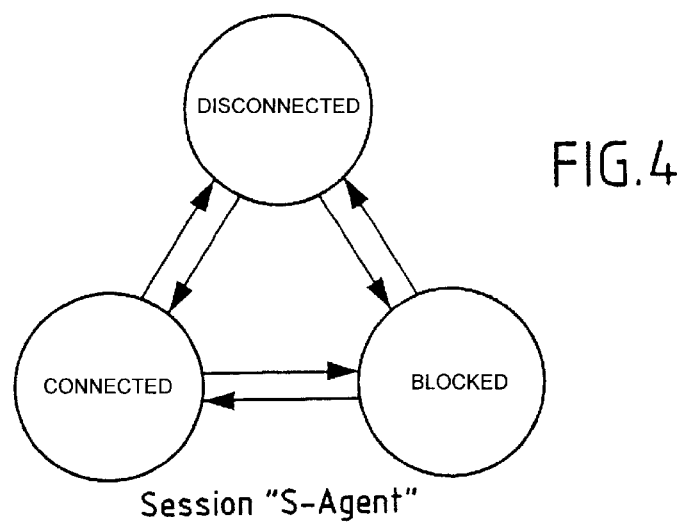
FIG. 4 is a diagram showing states of a session between software entities, called intelligent agents, according to one aspect of the invention.

FIG. 4 schematically illustrates the diagram of states of "S-Agent" sessions, such as have just been described.

The layers 130 and 230a manage tables (not shown) that contain the list of agents present, in the host terminal 1 and the smart card 2a.

In practical terms, the agents enable an exchange of data (in hypertext, for example), but also enable launching network transactions, authorizing communications between the smart card 2a and a remote server 4 (FIG. 3).

The configuration management modules, 131 and 231a, respectively, are similar to particular agents. For example, the module 131 in the host terminal 1 in particular manages information relating to the configuration of this terminal (modes of operation), lists other agents present, and so forth. The module 231a in the smart card 2a has analogous functions. These two agents can be put into communication with one another in order to establish a session.

In practical terms, the smart card 2a is advantageously "addressed" by using a URL (for universal resource locator) that defines a wrap-around to the terminal 1 itself, rather than pointing to an external server. By way of example, the structure of this URL is typically as follows:

$$\text{http://127.0.0.1:8080} \quad (1)$$

in which 127.0.0.1 is the wrap-around IP address, and 8080 is the port number.

Figure 5:
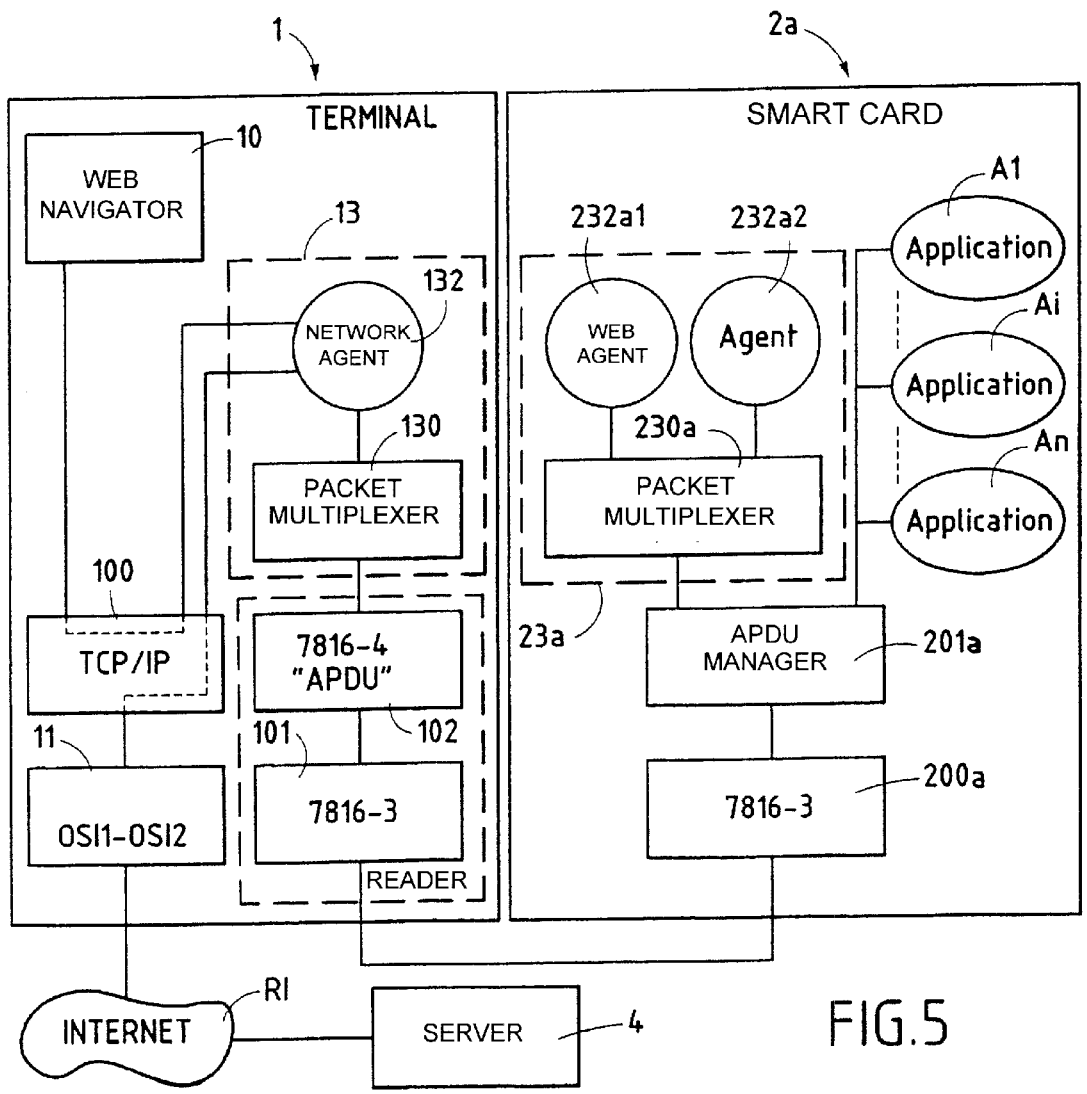
FIG. 5 in simplified fashion shows the logical architecture of a system according to the invention, in which the smart card includes intelligent agents.

FIG. 5 in simplified fashion shows the software architecture of a system according to the invention, of the type shown in FIG. 3 but now shown in more detail. The smart card 2a includes a plurality of agents, only two of which are shown: an agent $232a_1$ whose type is not precisely defined, of the web type, and an agent $232a_2$, of the web type. The software stack includes the lower protocol layers 200a, which meet ISO standards 7816-3 (FIG. 3: $CCa_1$ and $CCa_2$), the APDU command manager $201a_1$, and the packet multiplexer $230a$, this latter being interfaced with the agents, in particular the web agent $231a_1$.

There are two stacks in the terminal, one communicating with the internet RI and the other with the smart card $2a$. The first stack includes the devices 11 (FIG. 2: $C_1$ and $C_2$) for access to the network (standards OSI 1 and 2), and the TCP/IP protocol layers (FIG. 2: $C_3$ and $C_4$), reference numeral 100. These third layers are interfaced with the web navigator 10. The other stack includes the lower protocol layers 101, which meet ISO standards 7816-3 (FIG. 2: $C_1$ and $C_2$), the APDU order manager 102, and the packet multiplexer 130, this last being interfaced with agents, only one of which, 132, is shown. Assuming that this agent is of the network type, it can furthermore communicate on the one hand the navigator 10, via the TCP/IP layers 100, and on the other with the internet RI, via these same TCP/IP layers 100 and the device 11 for access to the network RI.

The APDU order manager $201a$ is also interfaced with one or more applications-level layers, which will simply be called applications. As has been noted, these applications $A_1 \ldots, A_i \ldots, A_n$, are application of a conventional type.

In summary, the client/webserver furnished by the smart card $2a$ can be embodied by association with the web agent $232a_1$ in the smart card and the network agent 132 in the terminal 1, and by implementing sessions between agents, as has been described.

The smart card $2a$ does indeed have the function of client/webserver. In addition, according to the invention, any conventional application $A_1$ through $A_n$ of the GCA type mentioned above can be activated through this client/webserver, either via the web navigator 10 in the terminal 1 or via a remote navigator 4 located at any point in the internet RI, by implementing sessions between agents. According to the method of the invention, the applications $A_1$ through $A_n$ do not have to be rewritten and are implemented as is.

In the context of the invention, all or some of the applications $A_1$ to $A_n$ can be constituted by applications associated with one or more of the aforementioned protocols PE, PL, etc., and loaded into a memory of the smart card $2a$. Data representing one or more profiles PA can also be stored in the smart card $2a$.

The client/webserver function offered by the smart card $2a$ is not sufficient to enable an application to be executed. An additional function must be attached to it.

In fact, in another aspect of the invention, the webserver function offered by the smart card $2a$ includes a mechanism similar to the function known as CGI (Common Gateway Interface) implanted in conventional webservers.

Before describing an example of architecture according to the invention that makes it possible to achieve a function of this type, even at the level of the smart card, it is useful to recall the principle characteristics of a CGI mode of operation.

CGI is a specification for implementing, from a webserver, applications written for the operating systems known as UNIX (registered trademark), DOS, or Windows (registered trademark). By way of example, for the UNIX operating system, the specification is CGI 1.1, and for the Windows 95 operating system, the specification is CGI 1.3.

Still by way of example, an http request for a URL address, of the following type:

"http://www.host.com/cgi-bin/xxx.cgi" (2), in which "host" refers to a host system (generally remote), is interpreted by a webserver as the execution of a command script of the CGI type, named "xxx" and present in the "cgi-bin" directory of this host system. Although the name of the directory can a priori be arbitrary, by convention it is the name given to the directory that stores scripts of the CGI type. A script is a set of instructions of the host system operating system, whose final result is transmitted to the web navigator that sent the aforementioned request. Different languages can be used to write the script, such as PERL (registered trademark).

In practical terms, the request is typically posted on an information processing screen as a form comprising an HTML page. The HTML language makes it possible to translate a form into a URL address. The form includes one or more fields which may or may not be obligatory and which are filled by a user, using conventional input means: a keyboard for text, a mouse for putting an X in boxes to be checked, or buttons labelled "radio", etc. The contents of the form (and as applicable, information and instructions said to be "cached") is sent to the webserver. The HTML code of the page describes the physical structure of the form (context, graphics, color, and any other attribute), and the structure of the data fields to be input (name, length, type of data, etc.).

The transmission can be done by two main types of format. A first format uses the method known as "POST", and a second uses the method known as "GET". Information on the format type is present in the code of the form page.

This mechanism cannot, however, be transposed directly to a smart card, even if the smart card has the client/webserver function in accordance with one of the characteristics of the invention.

An example of architecture that makes it possible to activate any application of convention type, via a webserver to the smart card, will now be described in conjunction with FIG. 6.

Among the intelligent agents, in accordance with one of the aspects of the invention, particular intelligent agents are provided, which will hereinafter be called script translator agents, abbreviated ATS. The script is then interpreted by one of these agents ATS. This translation can be done in various ways:

a) by the web agent $232a_1$ itself, which in this case is provided with a dual capacity;

b) by a unique script agent capable of translating all the scripts present in the smart card $2a$;

c) by a dedicated script agent, which will be called "ATSD" hereinafter (one agent per script); or d) by an APDU agent $2010a$ of the APDU order manager $201a$, which in this case is provided with a dual capacity.

The APDU agent $2010a$ is a component of the APDU order manager layer $201a$. The latter is a layer capable of centralizing all the APDU orders sent and/or received by the system, selecting from among applications $A_1$ to $A_n$, but also of offering an interface of the intelligent agent type. It is accordingly capable, according to the one of the characteristics of the invention, of communicating with all the intelligent agents (via sessions), whether the agents are located in the housing 6 or the smart card $2a$.

In case c) above, a session is opened between the web agent $232a1$ and one of the ATSD agents.

Figure 6:
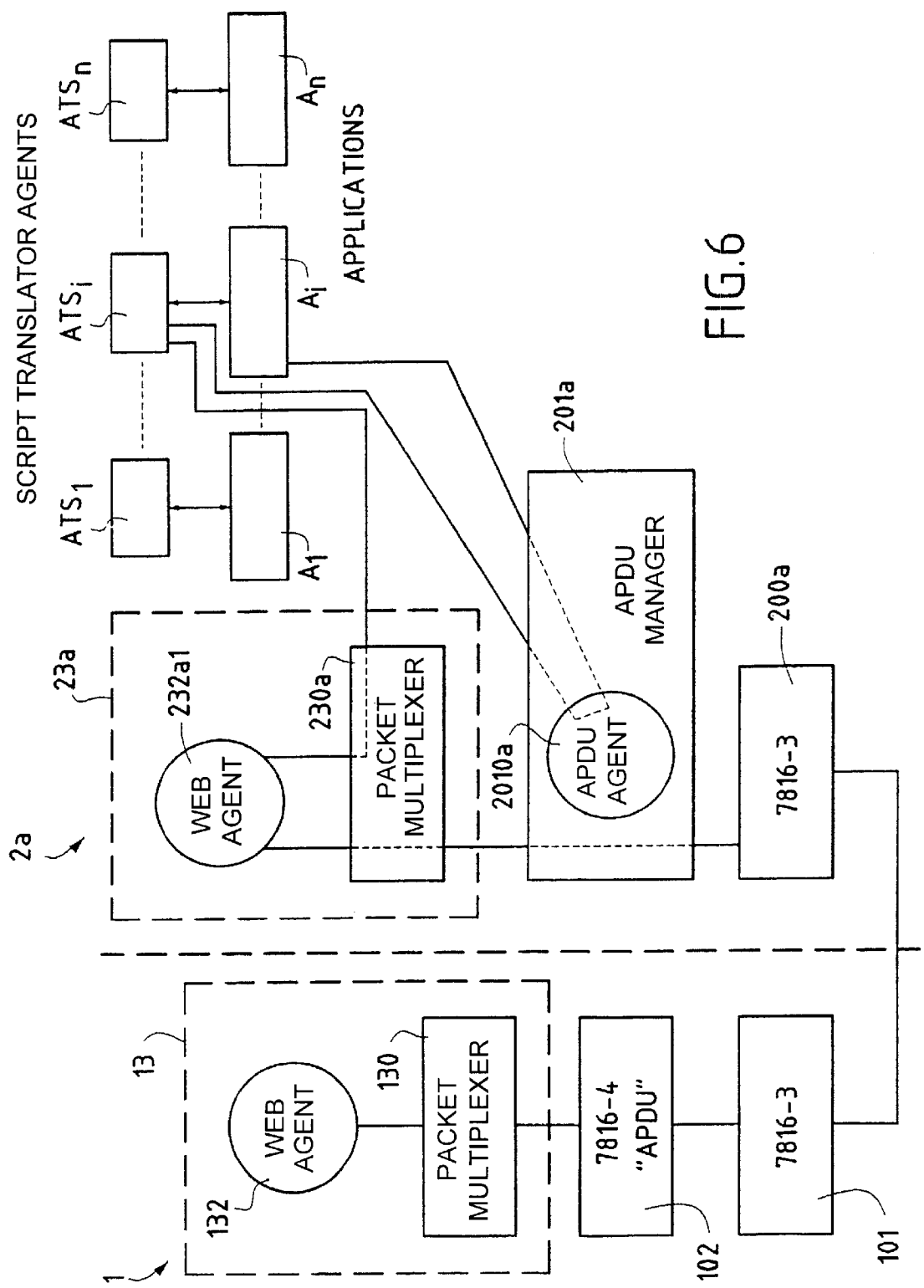
FIG. 6 in simplified fashion illustrates the logical architecture of a system in another aspect of the invention, in which the smart card includes intelligent script translator agents, in such a way as to implant a CGI function.

FIG. 6 shows an example of an architecture for which the translator agents are of the ATSD type. They are assigned reference symbols $ATS_1$ through $ATS_n$, and are associated with the applications $A_1$ through $A_n$. The application selected is assumed to be the application $A_i$ and the session is established between the web agent $232a_1$ and the agent $ATS_i$.

A script translator agent generates a set of APDU orders. A session is opened between the translator agent, such as the agent $ATS_i$ and the APDU agent 2101a. The orders are then sent to the APDU agent 2101a. The APDU order manager 210a selects the GCA application $A_i$ and sends it the APDU orders, which orders are translated and accordingly conventional, that it is capable of understanding. This application is then correctly activated without requiring modification or rewriting.

The responses from the application $A_i$ are transmitted to the APDU order manager 210a, to the APDU agent 2010a, and again to the agent $ATS_i$ (and more generally to the script translator agent).

The various pathways are symbolically represented in FIG. 6 by solid lines connecting function blocks, or dotted lines within these blocks.

To perform the operations of listing a subscriber in one or more directory servers and/or locating called subscribers, the method according to the invention utilizes the two characteristics that have just been recalled, that is, the functioning of the smart card as a webserver/client, including a CGI function.

In a preferred embodiment of the invention, the applications associated with the subscriber listing protocols PE and/or subscriber locating protocols PL, and optionally one or more subscriber profiles, are recorded in the smart card 2a.

The various phases and steps in the method of the invention for listing a subscriber and/or locating a called subscriber will now be described, in conjunction with FIGS. 7A through 9.

Figure 1:
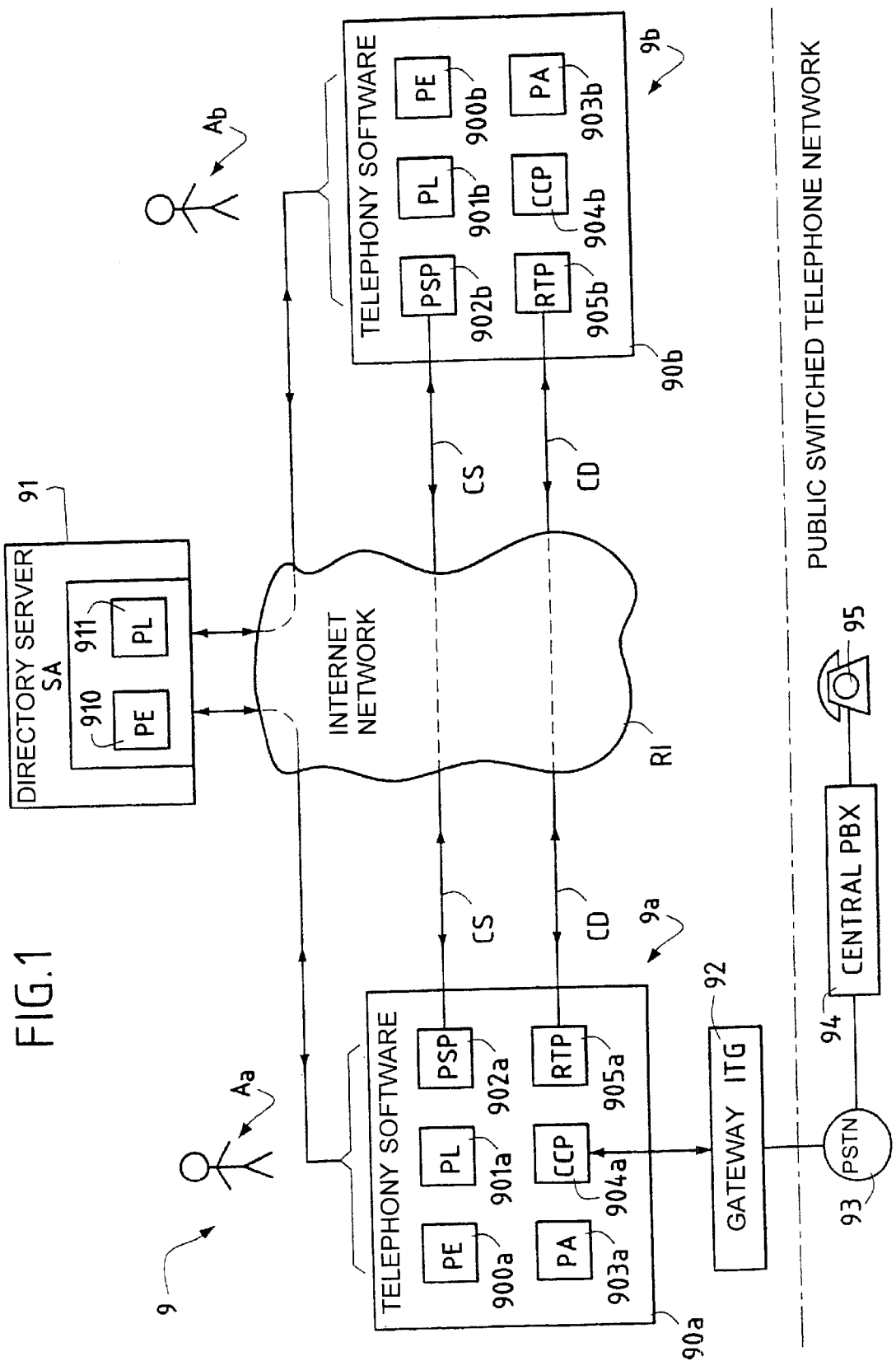
FIG. 1 schematically illustrates the main modules making up telephony software according to the prior art.

The first phase has to do with listing a subscriber profile in a particular directory server, which will hereinafter be called $SA_i$. This directory is a directory in accordance with the prior art (such as 91 in FIG. 1), and the method of the invention remains entirely compatible with what already exists.

In a first step, shown in FIG. 7A, the smart card 2a is addressed by the navigator 10 of the terminal 1, via the layers 13 and 23a. By a command of the "GET" type, for example, a loading form is retrieved from the smart card 2a, the form being in HTML, which will arbitrarily be called "download.html".

This retrieval is done by consulting a corresponding page whose URL typically takes the following form:

$$\text{http://127.0.0.1:8080/download.html} \qquad (3),$$

in which http://127.0.0.1:8080 is the URL wrap-around address per se, as defined by relation (1), and "download.html" is the HTML page to be obtained. This request employs a session between intelligent agents as has been described in conjunction with FIGS. 2–4, in a first aspect of the invention. The smart card 2a then plays the role of a webserver.

The smart card 2a sends the form "download.html" in a second step, still by opening sessions between matched intelligent agents, by the method of the invention. The form obtained can be posted on a screen 5 by way of the navigator 10 and is identified by P in FIG. 7A, which schematically illustrates this process. This form is a welcome page for the subscriber wishing to be listed in a directory server $SA_i$. The smart card 2a then behaves like a webserver.

The page P can in the usual way include various graphic and/or text elements, as well as interactive command elements (button of the "radio" type, boxes to be checked, data input zones, etc.).

Let it be assumed that in a first period of time, the smart card 2a offers its holder (not shown) the possibility of being listed on a unique directory server, which will be called $SA_u$, and in accordance with a unique subscriber profile, which can be called $PA_u$. Let it also be supposed that this unique profile $PA_u$ is recorded in the smart card 2a. On this hypothesis, the form P (that is, the welcome page) displayed on the screen 5a can be reduced to a minimal presentation, of which FIG. 7B illustrates one possible example, that is, form $P_1$.

The form $P_1$ includes various text zones, under the unique reference symbol $Z_t$. These zones typically display the name "xxx" of the directory server ($SA_u$), the action proposed, that is, "listing", and various help items (such as "click here"). Since it has been assumed that the data of the subscriber profile $PA_u$ were recorded in the smart card 2a, it suffices to provide a send button $B_S$. When the subscriber clicks on the button using a mouse (6b in FIG. 2A) or presses on the "enter" key of a keyboard (6a in FIG. 2A), this launches the sending of the form to the smart card 2a.

In another variant of the method of the invention, the data pertaining to the subscriber profile are captured directly by it. In this hypothesis, the form is more complex. FIG. 7C shows one possible example of a form, $P_2$. It includes a first fixed text zone $Z_{t1}$, similar to that ($Z_t$) in FIG. 7B, and one or more data capture zones, under the unique reference $Z_{t2}$. As before, a send button $B_S$ is provided, but advantageously also a button $B_{raz}$ for reinitializing the form $P_2$, which makes it possible to erase the captured data in the event of error. The data capture zone or zones $Z_{t2}$ can be of the "TEXTAREA" type in HTML and have a facility known as "elevator" for scrolling display of long texts.

The HTML code necessary for programming such a form is well known per se and is within the competence of one of average skill in the art. There is no need to describe it in detail again here. However, it might be noted that in particular it contains a line of code in HTML that is typically in the following form:

$$\text{<form action="http://127.0.0.1:8080/cgi-smart/loader">} \qquad (4),$$

in which http://127.0.0.1:8080 is the wrap-around URL from relation (1), cgi-smart is the aforementioned CGI directory, containing a script "pe" associated with one of the applications stored in the smart card, for instance referred to by the symbol $A_e$. This application makes it possible to list the subscriber in the directory $SA_u$ with the profile $PA_u$. This action is done as described in conjunction with FIGS. 5 and 6, by using the functions offered by the smart card 2a, that is, on the one hand, CGI, and client/server, on the other. The application $A_e$ behaves like a client.

In the first case (FIG. 7B), it is not necessary to send parameters to the smart card 2a. In fact, the data for the subscriber profile $PA_u$ are unique and are recorded in the smart card 2a.

In the second case (FIG. 7C), the data captured are sent as parameters to the smart card 2a, in the form of an http request.

FIG. 7D schematically illustrates the global process of the phase of listing a subscriber in a directory server $SA_u$, via the internet network RI.

The unique reference symbol $S_{WEB}$ combines different modules that have been explained in conjunction with FIGS. 5 and 6, which modules enable the smart card 2a to offer the combined functions of client/webserver and CGI or gateway. It has also been assumed that the application $A_e$ that enables the use of the listing protocol PE was assigned to a dedicated script translator agent $At_e$. This involves a configuration in accordance with that shown in FIG. 6. However, as has been noted, the translation of the scripts can be done in other ways (by the web agent $232a_1$), etc. Sending the form, by opening sessions between matched agents, makes it possible to activate the application $A_e$ by way of the script translator agent Ate.

In a later step, the application $A_e$ makes an HTTP request by opening sessions between pairs of agents, which in particular requires an agent of the "network" type (132 in FIG. 6). The request is transmitted to a directory server $SA_i$, with parameters being sent. The parameters in particular comprise subscriber profile data, so as to enable the subscriber to be listed in the directory. The URL address of the directory server is obtained from a subscriber profile recorded in the smart card 2a, or from data acquired in the form $P_2$ (FIG. 7C).

A priori, the listing process is terminated at this stage. However, it can include one or more additional steps. One of these steps can consist of sending an acknowledgment of receipt by the directory, in the form of an http request addressed to the smart card 2a. The acknowledgment of receipt can include an item of information indicating that the inscription proceeded satisfactorily, or if not, an error code. In the latter case, the listing process must be repeated. The server ask for the missing data to be sent or for incorrect or corrupted data to be retransmitted. The request for listing can also be rejected, especially if the limit for validity of the subscription has elapsed.

In a preferred variant of the method of the invention, it is possible for a subscriber to list himself in several different directories. In this variant embodiment, it is in general necessary also to have a plurality of listing protocols available. To do so, a plurality of applications associated with these protocols are stored in the smart card 2a, and can be referred to by reference symbols $A_{e1}, \ldots, A_{ei}, \ldots, A_{en}$, where the maximum number of separate protocols is n.

As before, the data associated with the subscriber profiles, which will be called $PA_1, \ldots, PA_i, \ldots, PA_q$, can be stored in the smart card 2a, or conversely furnished, stroke by stroke, by the subscriber in a method similar to what has been described in conjunction with FIG. 7C, by capture in a suitable form. The letter q is the maximum of subscriber profiles available. It should be noted that q is not necessarily equal to n. In fact, a given directory server, which can arbitrarily be called $SA_i$, can accept a plurality of separate occurrences of the same subscriber, on the one hand. On the other, a plurality of subscriber servers, although separate, can accept the same subscriber profile and optionally share a common listing profile.

Regardless of the method used to make the selection of all or some of the directory servers, the parameters sent to the smart card 2a must allow the selection of one or more subscriber profiles $PA_A$ through $PA_D$, and the derivation from them of one or more URL addresses. The actions required by the parameters sent to the smart card 2a are typically of the following type:

$$?sa_i=enr+pa_j \qquad (5),$$

where "$sa_i$" is the name of the directory server with an arbitrary subscript i among the n possible examples, "enr" is the action required for listing per se, and "$pa_j$" is the subscriber profile to be used, from among the q possible ones.

One or more http requests are presented and transmitted to the directory servers in question, which will be called $SA_A$ through $SA_n$, if there are n directory servers that can be selected.

The choice presented on the welcome page P is naturally a function of the smart card 2a inserted into the reader 3. The choices presented depend on the rights that are allowed to the subscriber who owns the smart card 2a, in particular subscriptions to given services and their periods of validity.

A second phase of the method of the invention, that is, locating a subscriber associated with an arbitrary identifier in the internet network, can proceed in a manner quite similar to the listing phase.

This requires consulting one or more directory servers. It is also necessary to have at least one specific protocol PL for locating this subscriber. Finally, if there are a plurality of directory servers that can be consulted, $SA_1$ through $SA_n$, it is also generally necessary, as in the case of listing, to have a plurality of separate locating protocols available.

These locating protocols can be employed with the aid of applications stored in the smart card 2a.

The locating process proceeds in a manner quite similar to that of listing the subscriber in one or more directory servers $SA_i$. The only notable exception is that a subscriber profile $PA_j$ is no longer explicitly required. It suffices to furnish the smart card 2a with the identifier of the subscriber sought and the address of the directory server $SA_i$, or at least parameters that enable the application assigned to one of the locating profiles to determine this URL address. A subscriber profile $PA_j$ can nevertheless be used, so that from it the URL address of the directory server $SA_i$, with the aid of which a calling subscriber wishes to locate a called subscriber, can be derived automatically. As has been indicated, the identifier of the subscriber sought can be his e-mail address, and this address is typically in the following form:

$$\text{pseudo@provider.com} \qquad (6),$$

where "pseudo" is the name of the user of the subscriber e-mail service, or more generally a pseudonym, and "provider.com" is the name and suffix of the internet service provider (".com" can be replaced as applicable by various suffixes, such as ".fr", ".net", etc.).

Figure 8:
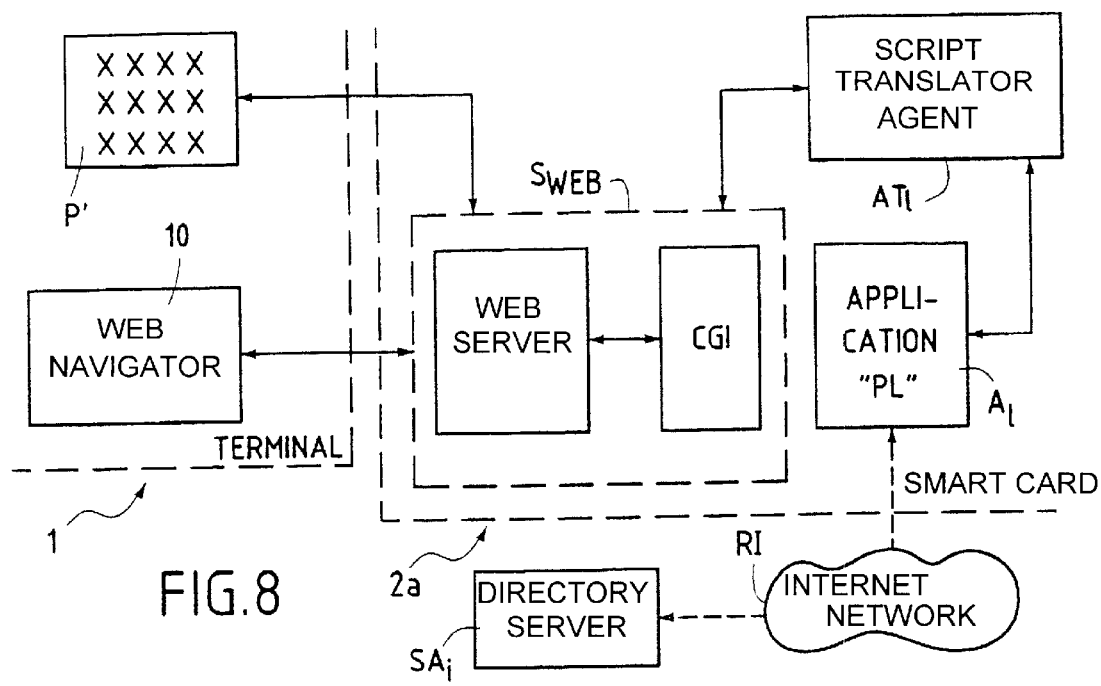
FIG. 8 schematically illustrates the main steps in the phase of locating a subscriber in the internet network by consulting a directory server.

FIG. 8 illustrates the principal steps in the phase of locating a subscriber with whom one seeks to establish a telephone communication, by consulting a directory $SA_i$.

In a first step, the smart card 2a is addressed by the navigator 10 of the terminal 1, via the layers 13 and 23a. By a command of the "GET" type, for example, a loading form is retrieved from the smart card 2a, in the form of a welcome page P'. This welcome page can assume various aspects, in particular similar to those described in conjunction with FIG. 7C. Depending on whether there are one or more possible choices, the subscriber selects one or more directory servers and furnishes the identification data for the subscriber sought. In FIG. 8, it has been assumed that only a single directory server $SA_i$ could be consulted.

The page is transmitted in the form of an http request to the smart card 2a and is interpreted by a script translator agent $At_I$ associated with an application $A_I$ for implementing the protocol PL.

By the dual mechanism, client/webserver and CGI (a module $S_{WEB}$ as before), a request of the following type:

$$\text{http://127.0.0.1/?sa}_i=\text{loc+pseudo@provider.com} \qquad (7)$$

is interpreted by the smart card 2a as a request for locating the subscriber, whose identifier is (6), in the directory server $SA_i$.

An http request is transmitted to this server, which sends the information requested, if available. It consults its database for an IP address corresponding to the identification data received. If it is successful, that is, if the requesting subscriber is in fact listed, if this subscriber has the right to obtain this address, and if the data received are correct, then the data retransmitted include the IP address of the subscriber sought, which makes it possible to locate him.

These various steps employ sessions between matched agents, according to one of the aspects of the invention.

It is also possible for a plurality of applications to be stored in the smart card 2a, each of them being intended to implement a separate locating protocol assigned a priori to an also-separate directory server.

In a preferred variant of the method of the invention, applications making it possible to implement a plurality of listing protocols, a plurality of locating protocols, and data files for listing a plurality of subscriber profiles are stored in the smart card 2a. This advantageous arrangement makes it possible to convert the smart card 2a into a portable, multi-directory database.

In still another variant of the method of the invention, using a smart card 2a makes robust authentication of its owner possible, in the listing phase and/or the locating phase. It is in fact possible to store security data in the smart card, which remains the property of its owner. Such security data can comprise encryption keys.

Because in one of the advantageous aspects of the method of the invention the smart card 2a can communicate directly with the internet network by employing sessions between agents, these data do not have to be transmitted to an external device, such as the terminal 1. The processing operations involving security are performed directly by the smart card 2a. Proceeding in this way accordingly offers a much higher degree of security than simply using safeguarded software layers of web navigators of recent vintage, known by the abbreviation SSL (for Secure Socket Layer).

The authentication per se can be done with recourse to what is known as the certificate technique, in association with the aforementioned encryption keys stored in the smart card 2a. This procedure can require additional transactions between the smart card 2a and the directory server or directory servers in question, with the aid of http requests traveling over the internet network RI. As a function of the result, whether positive or negative, of the authentication, the subscriber either is or is not authorized to perform the processing operations, listing, or locating operations he wishes to perform.

In another feature of the invention, and with recourse again to intelligent agents, a function known as "proxy TCP/IP" is implanted directly in the smart card 2a. This function is embodied by a particular software application, which will hereinafter be called a "filter".

The "proxy" function is well known in the field of internet applications, but it cannot be implanted in smart cards of systems according to the prior art.

Figure 9:
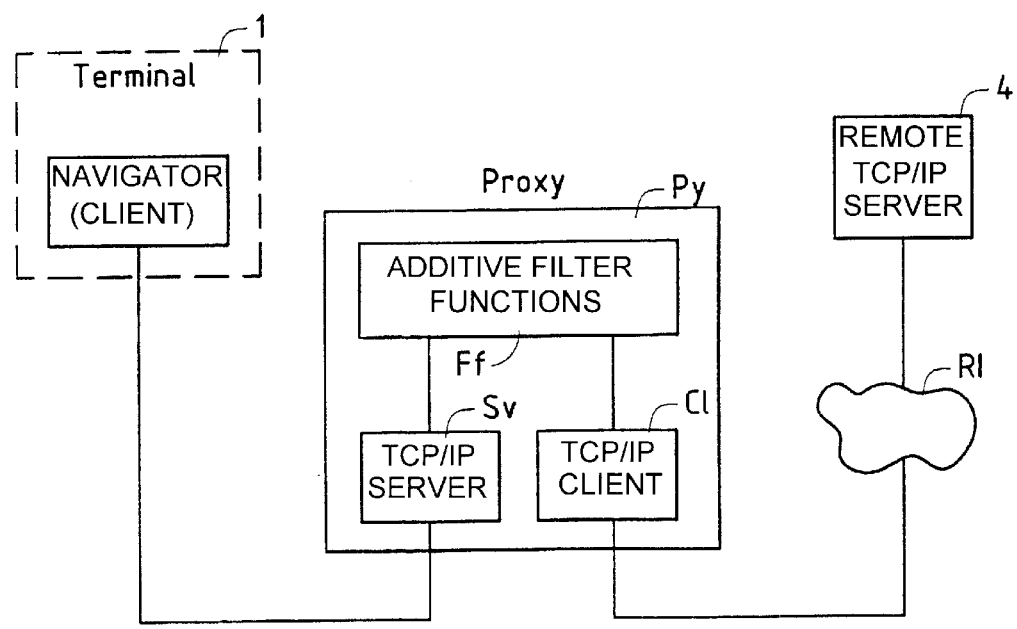
FIG. 9 schematically illustrates a proxy, according to the prior art.

Before an architecture according to the invention is described, the characteristics of a classical proxy according to the prior art will be reviewed briefly, in conjunction with FIG. 9.

In TCP/IP technology, a software entity Py is called a proxy when on the one hand it embodies a TCP/IP server Sv and on the other a TCP/IP client Cl. The software entity Py makes a connection between a local client and some other remote TCP/IP server.

A proxy Py usually performs the functions of a filter and/or security functions. For example, an http proxy generally assures the connection of a navigator, such as the navigator 10 of the terminal 1, to a webserver 4 in a business (this is known as a firewall). It can also be an SSL proxy, which can be defined as a proxy that is local to the terminal and that performs the requisite security operations (authentication, confidentiality, integrity) for establishing a safeguarded tunnel through the internet RI.

A logical architecture that integrates the proxy function directly in a smart card, in accordance with an additional aspect of the invention, will now be described in conjunction with FIG. 10.

The elements common to the preceding drawing figures have the same reference numerals and will not be described again except as needed. To simplify the description, the agents in the terminal 1 are grouped under the unique reference numeral 132, and those in the smart card 2a are grouped under the unique reference numeral 232a. They will be differentiated hereinafter by the letter "T" for terminal and "S" for smart card, and these letters are assigned index numerals. The proxy 27 embodied on the smart card 2a will be called a "smart proxy" hereinafter.

The smart proxy 27 is embodied by the association of four agents, that is, two in the terminal 1: $T_1$ and $T_2$, and two in the smart card 2a: $S_1$ and $S_2$, and a filter function 28, as described below:

a "terminal/client/network" agent $T_1$ embodies a TCP/IP server (for example at the port 8080);

a "card/server/local" agent $S_1$ is associated with the agent $T_1$ via a session, and this agent typically performs the functions of a webserver;

a filter function 28, which is determined as a function of information originating in the agent $T_1$, is capable of sending or receiving pdus to and from the agents $S_1$ and $S_2$;

a "card/client/local" agent $S_2$, an instance of this agent being created dynamically by the filter function 27; $S_2$ opens a session with the network agent $T_2$, to which it tells the address of the remote internet server 4 to which $S_2$ seeks to be connected; and an agent "terminal/server/network" $T_2$ embodies the function of a TCP/IP client which is connected to an internet server 4.

The mechanism for creating the smart proxy 27 is described below.

A TCP client, hereinafter called cTCP, typically the web navigator 10, opens a connection with the network agent $T_1$. A session $T_1$-$S_1$ is then created. For example, the following URL:

http://127.0.0.1:8080/?des1=xxx.com:80/yyy/content.html (8)

causes the opening of a session between the agents $T_1$ and $S_1$.

On the basis of data exchanged by T1 and S1, the application assigned to the agent S1 (a webserver) determines which filter function 28 is to be used. Thus "des1" is the name of a particular filter; "xxx.com" is the arbitrary number of an internet server, such as the server 4; "80" is a port number; and "/yyy/content.html" is the arbitrary name of a file in this server, for example constituted by a page in HTML language. In the example, the filter "des1" is a filter making it possible to perform a decryption and/or encryption operation in accordance with an algorithm of the DES (data encryption standard) type. In the context of the invention, the server 4 comprises a directory server (such as $SA_i$ in FIGS. 7D and 8).

In other words, the "card" URL, defined by statement (2), encapsulates another URL intended for the outside world; the first part of the card URL is made up of the wrap-around URL as defined by statement (1).

The filter 28 "des1" creates an instance of client $S_2$; a session is opened between the agents $S_2$ and $T_2$. The data inserted into the first pdu ("pdu OPEN") states the name of the internet server ("xxx.com") and its assigned port number (80).

The agent $T_2$ opens a connection of the TCP type with the remote server "sTCP" ("zzz.com"). Once this connection has been made, a token is sent, whose destination is $S_2$.

In terms of these exchanges, a smart proxy 26 has been created; a filter function 28 that is resident in the smart card 2a is capable of processing the data (originating from the internet RI) received by the network agents. The filter 28 controls the data output by the network agents $T_1$ and $T_2$, in a logical way. It behaves like a proxy TCP that controls the data exchanged between the client cTCP and the server sTCP.

Figure 10:
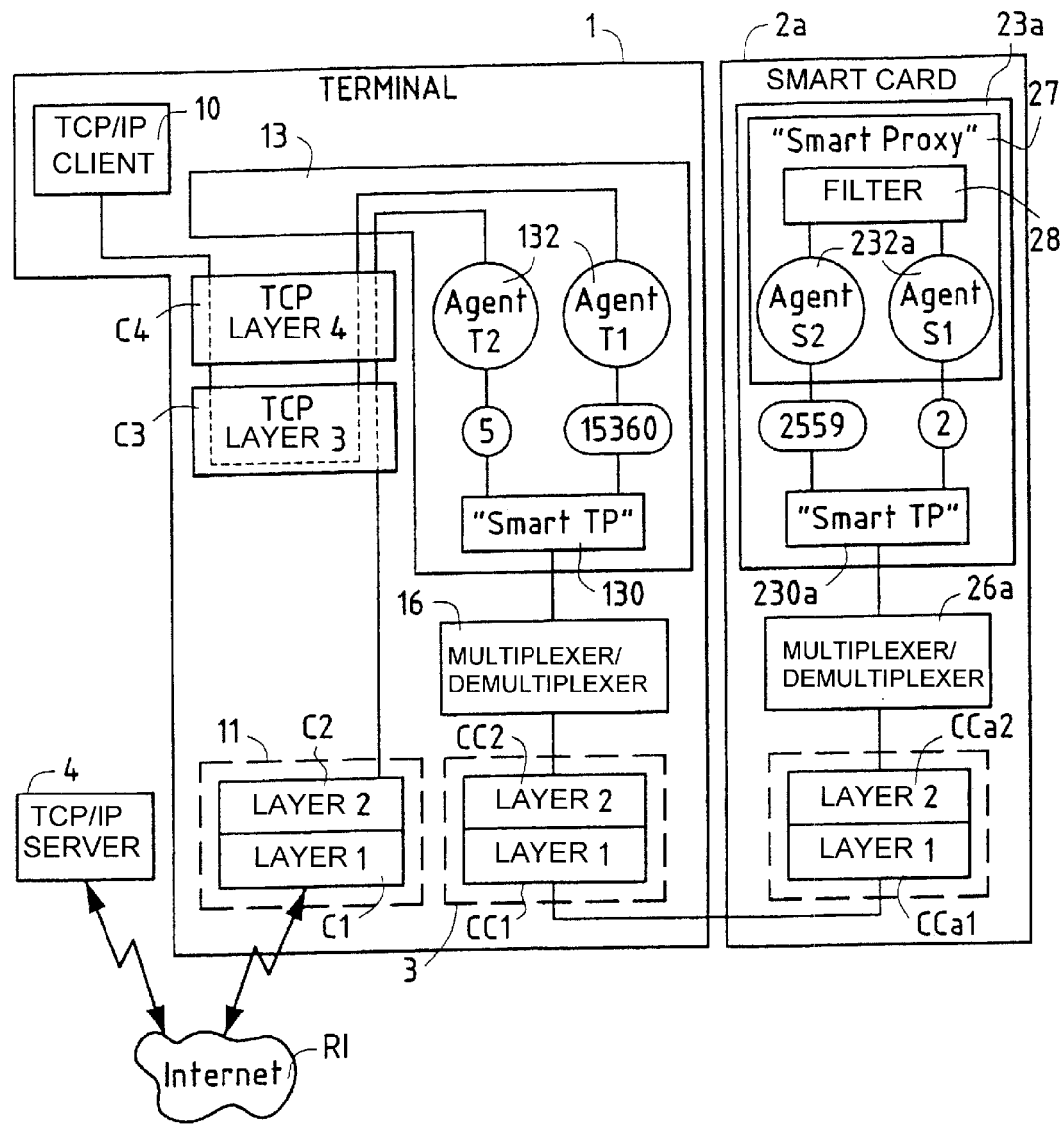
FIG. 10 in simplified fashion illustrates the logical architecture of a system according to the invention in accordance with that of FIG. 4, in which a proxy filter is embodied in the smart card.

To define these terms, arbitrary reference numerals for various agents have been shown in FIG. 10: fixed numerals 2 and 5 for agents of the server type, that is, $T_2$ and $S_1$, respectively, and variable or ephemeral numerals 15360 and 2559 for agents of the client type, that is, $T_1$ and $S_2$ respectively.

Other types of filters can be implanted in the smart card 2a. These filters can then be used to implement negotiations for exchanging encryption keys or for reserving a routing path of particular characteristics. By way of example, if the calling subscriber wishes to transmit a multimedia file at high speed or a large quantity of data, he would like to obtain a guarantee of minimal bandwidth and/or that there is no traffic jam, which would be onerous.

Precisely, another type of filter on the smart card 2a can perform a function of pricing, conventionally based on the speed or on the quantity of data exchanged, but also on the type of path negotiated with a service provider during the signaling phase. To do so, essentially counters are used, as is well known per se.

Once a subscriber has been located, the proxy function, implanted directly in the smart card 2a, is used for the steps corresponding to the operations of signaling and/or data exchange per se between a calling subscriber and a subscriber that has been located and called.

It will be understood that the method according to the invention, used by a calling subscriber, does not require that the called subscriber also employ this same method. It is in fact an additional advantage of the invention that one of the subscribers, for instance the called subscriber, can use a standard terminal in accordance with the prior art (9b in FIG. 1). It is in particular not necessary for the terminal to be provided with a smart card reader. In other words, at least with regard to one of the installations associated with one of the subscribers, either the caller or the called party, the method according to the invention is entirely compatible with the existing telephony hardware and software, and the other installation requires only slight modification to conform to the method of the invention.

However, let it be assumed that in a preferred variant of the invention, the calling subscriber and the called subscriber both use a terminal using the method of the invention. Hereinafter, the calling side will be arbitrarily referred to by reference letter "a", and the called party side will be referred to by letter "b".

Figure 11A:
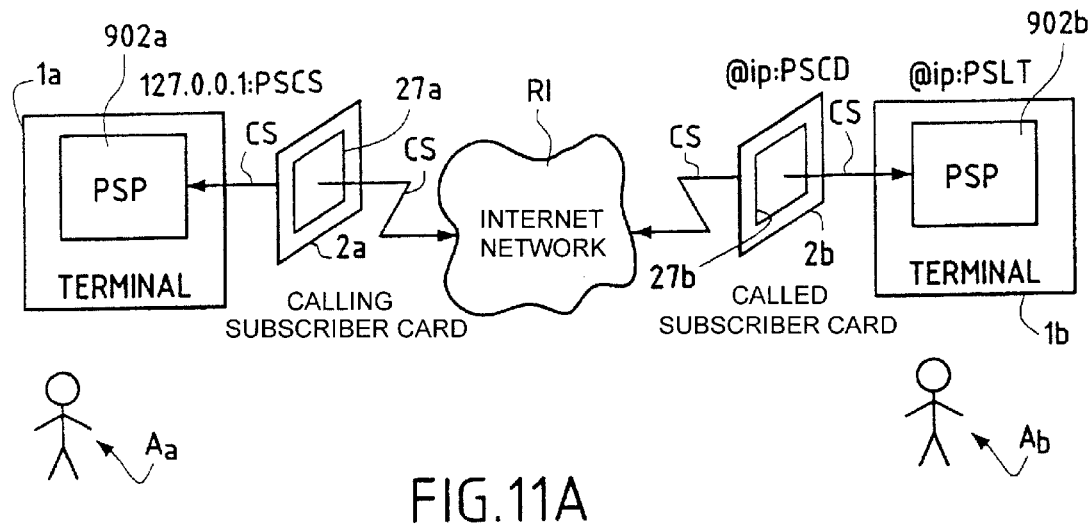
FIG. 11A schematically illustrates the architecture of a telephony system according to the invention employing the proxy function for the signaling channel, both for the calling subscriber and the called subscriber.

FIG. 11A schematically shows the architecture of a telephony system employing the proxy function for the signaling channel CS, on the part of both the calling subscriber Aa and the called subscriber Ab.

In this drawing figure, the calling terminals 1a and 1b are reduced, for the sake of simplicity of description, only to the items of software associated with the signaling protocols or PSPs 902a and 902b, respectively. These items of software are a priori in conformity with the corresponding items of software in the prior art (see FIG. 1).

However, the proxy function may require its adaptation, to be able to support internet smart cards that employ the method of the invention. At least, as will be demonstrated, they must be capable of being parametrized in such a way as to modify the signaling port number (of the TCP type). Certain telephony programs, in standard or commercial versions, do not enable this parametrization. By way of non-limiting example, one can cite the "NetMeeting" software, while the "WebPhone" software does permit it, both of these types of software being cited in the background section of the present patent application.

However, the value of using a signaling proxy is to be capable of using a procedure of simple or mutual authentication between the calling subscriber Aa and the called subscriber Ab, which can be useful for accepting communications, for example.

The smart card 2a of the calling subscriber Aa is associated with a server, which according to the invention comprises a TCP network server agent, or signaling agent, at a TCP port. This port will be called SCSP for Source Card Signaling Port. The smart card 2a of the calling subscriber Aa connects itself to the corresponding signaling port of the smart card 2b of the called subscriber Ab. This port will be called TCSP for Target Card Signaling Port. It is located at an IP address, which will arbitrarily be called "@ip". The called card 2b embodies a signaling proxy between the TCP port TCSP and the TSSP port, for Telephony Software Signaling Port, of the terminal 1b of the called subscriber Ab.

These transactions require the establishment of sessions between matched agents, according to one of the characteristics of the method of the invention as has been described in conjunction with FIGS. 3–5, and the implementation of the proxy function, in another characteristic of the method of the invention which has been described in conjunction with FIG. 10.

In FIG. 11A, the proxies of the smart cards 2a and 2b are represented schematically by reference numerals 27a and 27b. In actuality, they include different elements shown in FIG. 10: agents $S_1$ and $S_2$, and filter 28.

To define the concepts, the main steps in the signaling phase will now be described, in terms of a practical exemplary embodiment. To define the concepts, it is assumed that the URL wrap-around address of the card is that given by relation (1), that is, 127.0.0.1, and the arbitrary port No. 1731. The port number for telephony programs is generally 1503. The address of the called subscriber Ab, as has been determined in the locating phase, is @ip.

On the Part of the Calling Subscriber Aa:
1) preparation step: configuration of the proxy 27a in such a way as to perform the translation of 127.0.0.1:1731 to @ip:1503;
2) calling steps:
    2a) PSP calling 902a calls 127.0.0.1:1731;
    2b) the calling smart card 2a calls @ip:1503; and
    2c) the called smart card 2b calls @ip:1502.

On the Part of the Called Subscriber Ab:
1) preliminary preparation step: modification of the PSP (called) signaling port number from 1503 to 1502; and
2) step of communication between the smart card 2b and the terminal 1b, using an agent of the TCP network type at the port 1503 and the proxy function 27b between the ports 1503, at the card input, and 1502 at the output.

Naturally, if only the calling subscriber system 1a–2a is of the type according to the invention, then the smart card 2a calls the called subscriber system directly at the URL address @ip:1502.

Optionally, a pair of encryption keys can be negotiated in the course of the signaling procedure. The exchanges of the corresponding data are also done by establishing sessions between matched agents.

The smart card according to the method of the invention can also behave like a data exchange protocol proxy (of the UDP type) over the data channel CD. As before, this function can require the adaptation of telephony programs in such a way as to support smart cards according to the present invention.

However, once again, using a data exchange proxy has a certain value. This resides in the fact that it is possible to employ a method of encryption/decryption of information. The standard G723, for example, which compresses audio with rates between 5.3 kbps and 6.3 kbps, is compatible with the speeds of current smart cards, which are typically between 9600 bps and 105900 bps. As has been described in conjunction with FIG. 10, the filter of the proxy can in particular be a filter enabling the performance of an operation of decryption/encryption by an algorithm of the DES type.

Figure 11B:
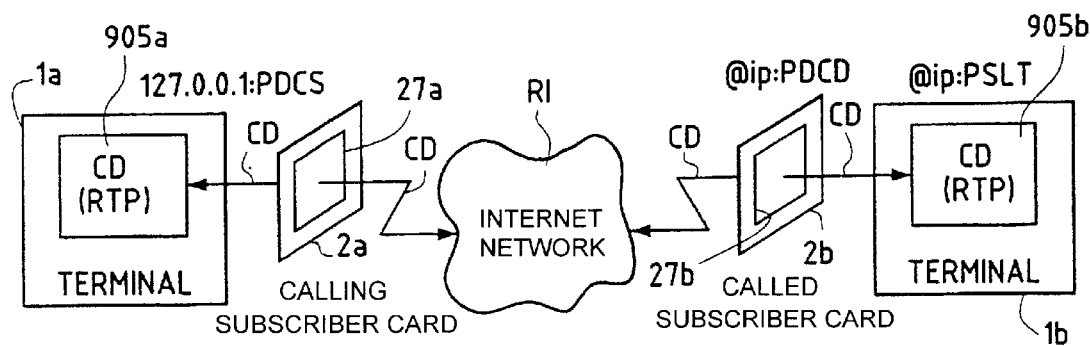
FIG. 11B schematically illustrates the architecture of a telephony system according to the invention using the proxy function for the data channel, for both the calling subscriber and the called subscriber.

FIG. 11B schematically illustrates the architecture of a telephony system that uses the proxy function, for the data channel CD, both in the calling subscriber Aa and the called subscriber Ab. In FIG. 11B, the proxies of the smart cards $2a$ and $2b$ are schematically represented by reference numerals $27a$ and $27b$. In actuality, as before, they comprise the various elements shown in FIG. 10, that is, agents $S_1$ and $S_2$ and the filter 28.

The smart card $2a$ of the calling subscriber Aa is associated with a server, comprising a network server of the UDP type for data exchange at a UDP port SCDP, for Source Card Data Port. The smart card $2a$ of the calling subscriber Aa connects itself to the data exchange port of the smart card $2b$ of the called subscriber Ab, which will be called TCDP, for Target Card Data Port, the card being located at an arbitrary IP address "@ip". The smart card $2b$ of the called subscriber Ab embodies a data exchange proxy between the UDP port TCDP and the TSDP port, or Telephony Software Data Port, of the terminal $1b$. In that case, it is necessary to employ two data exchange proxies: the proxy $27a$ of the calling subscriber Aa to the called subscriber Ab, and the other proxy $27b$ for the called subscriber Ab to the calling subscriber Aa.

As before, if only the calling subscriber system $1a$–$2a$ is of the type according to the invention, then the smart card $2a$ calls the called subscriber system directly.

Figure 12:
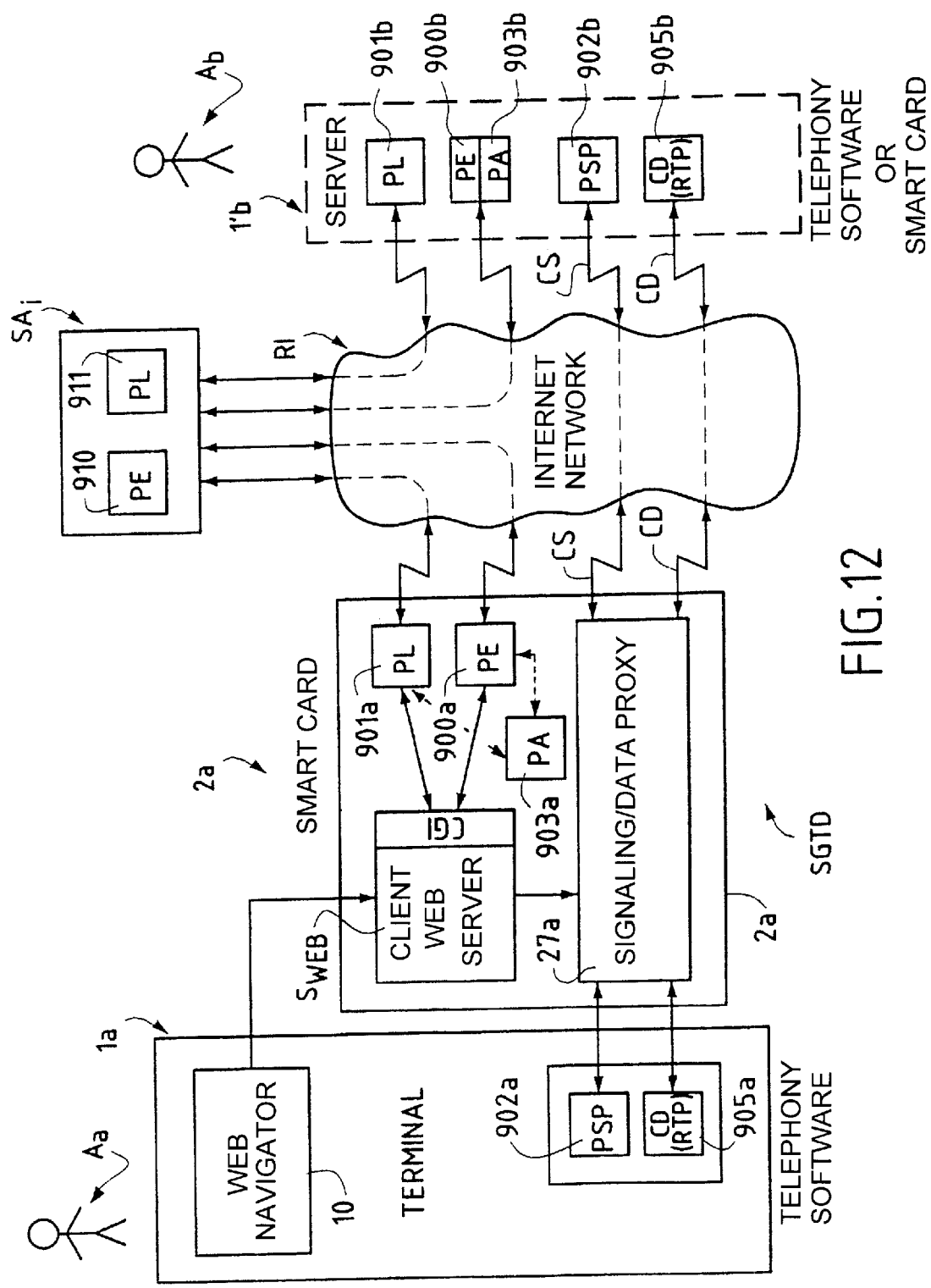
FIG. 12 schematically illustrates the general architecture of a system for managing transmission of telephony data, in a preferred embodiment of the invention, between a calling system including a terminal and a smart card, on the one hand, and a called system, on the other.

FIG. 12, which combines FIGS. 11A and 11B, schematically illustrates the general architecture of a telephony data transmission management system SGDT (and more generally, for transmitting multimedia data) between a calling subscriber Aa and a called subscriber Ab, and more precisely between a calling system including the terminal $1a$ cooperating with the smart card $2a$, on the one hand, and a called system known as a server, globally referred to by reference numeral $1'b$. The called system $1'b$ can arbitrarily have a configuration similar to the calling system, that is, according to the invention: terminal $1a$ cooperating with a smart card $2a$ (as described for FIG. 11A and/or FIG. 11B), or the configuration of a system of the prior art ($9b$ in FIG. 1). The elements common to the foregoing drawing figures have the same reference numerals and will not be described again except as needed.

FIG. 12 illustrates the various interactions between elementary components of the telephony data transmission management system according to the invention, as have been explained, particularly in conjunction with FIGS. 3–8 and 10–11B. Still more precisely, the smart card $2a$ illustrates a preferred embodiment of the invention, for which the applications associated with the listing protocols PE, $900a$, and the locating protocol PL, $901a$, as well as a subscriber profile PA, $903a$, are recorded in the memories of this smart card $2a$ (as explained by FIGS. 7D and 8). Similarly, it has been assumed that the smart card $2a$ has the proxy function $27a$, both for the signaling channel CS and for the data channel CD (FIGS. 11A and 11B). As has been described above, the proxy $27a$ is under the control of the client/server $S_{WEB}$ of the smart card $2a$.

Finally, although only one directory server $SA_i$ has been shown in FIG. 12, in a preferred embodiment applications that make it possible to use a plurality of listing protocols, a plurality of locating protocols, and data files for listing a plurality of subscriber profiles are stored in the smart card $2a$. This advantageous arrangement makes it possible to convert the smart card $2a$ into a portable multi-directory database. The server or servers themselves are entirely similar to the servers in the prior art, such as the server 91 in FIG. 1. It includes protocols PE, 910, for listing subscribers and PL, 911, for locating subscribers.

From the above description, it can easily be seen that the method of the invention does attain the objects assigned to it.

The function known as the proxy function implanted directly in the smart card, in cooperation with the client/webserver function, offered by the smart card makes it possible to use a smart card as a signaling protocol and/or data exchange proxy.

If the smart card is used as a signaling protocol proxy, it is possible in particular to employ a method of simple or mutual authentication between a calling subscriber and a called subscriber. It is also possible to negotiate encryption keys and/or to reserve a routing path that offers predetermined transmission characteristics.

If the smart card is used as a communication protocol proxy, it is possible in particular to employ an encryption/decryption procedure. It is also possible to perform pricing operations, based for example on the speed or the quantity of data exchanged, or taking into account the reservation made beforehand.

The method according to the invention also enables a subscriber, for example the calling subscriber, to list himself in one or more directory servers and/or to locate another subscriber, known as the called subscriber, in the internet network, also by way of one or more directories. Because the smart card has the combined functions of a client/webserver and a gateway or CGI, this arrangement enables direct communications between the smart card and the directory server or directory servers. As a result, it authorizes the storage of the specific programs required to use the listing and/or locating protocols, which makes high mobility possible. One or more subscriber profiles can also be stored in the smart card. The subscriber is not compelled to use terminals configured specifically for the aforementioned protocols.

The method of the invention is entirely compatible with the existing art. It is not necessary for the subscriber, either the caller or the called party, to be listed in one or more directory servers by using the method of the invention, nor to be provided with a terminal that has a smart card reader according to the invention. The transmissions over the internet network are done in accordance with the protocols in force, and the communications between the subscriber terminal using the method of the invention and his smart card make use of the aforementioned standardized ISO protocol. Hence a standard smart card reader can be employed. Only the presence of a specific software layer in the terminal is necessary, and this requires only slight modifications, which can be done once and for all, regardless of how many listing and locating protocols and/or subscriber protocols are carried in the smart card, and regardless of their nature. The same is true for the proxy filters implanted in the smart card.

Finally, using a smart card makes it possible to safeguard transactions and in particular makes a "robust" authentication possible. It also enables the negotiation of a routing path and/or pricing of the data exchanged.

However, it should be clearly understood that the invention is not limited only to the exemplary embodiments explicitly described, in particular in conjunction with FIGS. 3–8, on the one hand, and 10–12, on the other.

In particular, it is not necessary for both series of proprietary software, PE and PL, to be stored in the smart card, although this arrangement is particularly advantageous. By way of non-limiting example, the phases of listing in one or more directory servers can be done once and for all, or at least, since a priori these are performed less often than the locating phases, it is sufficient to store only the specific applications associated with this latter operation in the smart card. Similarly, as has been noted, it is possible not to record the subscriber profiles PA in the smart card (since the data can be furnished in real time at the moment the subscriber is listed in a particular directory server). It is also possible for only a portion of the subscriber profiles to be recorded, which profiles could be furnished automatically.

Finally, as has been noted, the invention is not limited to managing only data of the telephony type. More generally, it makes it possible to manage other types of multimedia data, in particular videophone data.

The invention also relates to a method for managing transmissions of multimedia data via an internet-type network between a first subscriber system and a second subscriber system including at least one phase of signaling data exchange, via a signaling channel, with the aid of a predetermined signaling protocol, and a phase of exchanging said multimedia data via a data channel, with the aid of a predetermined communication protocol, characterized in that at least said first subscriber system includes a terminal provided with a web-type navigator and a smart card reader that cooperate via a smart card, the terminal and the smart card including information processing means and information storage means, said smart card (2a) including a first item of software (23a), forming a specific communication protocol layer, and said terminal (1a) including a second item of software (13), forming a specific communication protocol layer and forming an interface with at least said web-type navigator (10); said first and second items of software (13, 23a) further include at least a first autonomous software entity ($T_2$, $S_1$) of the client type and a second autonomous software entity ($T_1$, $S_2$) of the server type, said entities ($T_1$, $S_2$, $T_1$, $S_2$) cooperating, thanks to said information processing means, in such a way as to enable to establishment of bidirectional data exchange sessions between said terminal (1a) and said smart card (2a), and that said smart card (2a) offers the function of a client/web server, and to enable to establishment of a bidirectional data exchange between the terminal (1a) of said first subscriber system and said second subscriber system (1'b) via said internet-type network (RI), said autonomous software entities communicating by means of predetermined protocol data units;

that it includes the embodiment, in the information storage means of said smart card (2a), of an item of applications software of predetermined functional characteristics, known as a filter (28), which receives and/or sends protocol data units to and/or from said first and second autonomous software entities ($S_2$, $S_1$) of the client and server type, respectively, which are included in said second specific piece of software (23a), the embodiment of said applications item being under the control of said autonomous software entity of the server type ($S_1$); and that said filter (28) cooperates with said autonomous software entities ($S_2$, $S_1$) of said second specific item of software (23a) to open a session with said autonomous software entities ($T_2$, $T_1$) of said first specific item of software, thanks to said information processing means of the terminal and of the smart card, in order to form a function known as "proxy" (27a) and to control predetermined characteristics of data exchanges that pass between said first subscriber system (1a, 2a) and said second subscriber system (1'b), via at least one of said signaling channels (CS) and/or data channels (CD), during said phases of exchanging signaling data and/or multimedia data.

The invention also relates to a smart card, including information processing means and information storage means and intended to cooperate with a terminal provided with a smart card reader, in such a way as to form a first subscriber system for managing transmissions of multimedia data via an internet-type network between said first subscriber system and a second subscriber system, said management including at least one phase of exchanging data called signaling data, via a signaling channel, with the aid of a predetermined signaling protocol, and a phase of exchanging said multimedia data via a data channel, with the aid of a predetermined communication protocol, characterized in that said smart card (2a) includes, in the information storage means, an item of software (23a), forming a specific communication protocol layer, further including at least one first autonomous software entity ($S_1$), of the client type, and a second autonomous software entity ($S_2$) of the server type, said entities ($S_2$, $S_2$) cooperating in such a way that said smart card (2a) offers the function of a client/webserver and so as to enable the establishment of data exchanges between the terminal (1a) of said first subscriber system and said second subscriber system (1'b) via said internet-type network (RI); and that said smart card (2a) further includes an item of applications software of predetermined functional characteristics, called a filter (28), which receives and/or sends protocol data units from and/or to said first and second autonomous software entities ($S_2$, $S_1$), of the client and server types, respectively, that are included in said specific item of software (23a); said applications item being embodied under the control of said autonomous software entity of the server type ($S_1$); and that said filter (28) cooperates, thanks to said information processing means, with said autonomous software entities ($S_2$, $S_1$) of said second specific item of software (23a) to enable the opening of a session between said autonomous software entities ($T_2$, $T_1$) of said first specific item of software to form a function called a proxy (27a) and to control predetermined characteristics of the data exchanges traveling between said first subscriber system (1a, 2a) and said second subscriber system (1'b), via at least one of said signaling channels (CS) and/or data channels (CD), during said phases of exchanging signaling data and/or multimedia data.

What is claimed is:

1. A method for managing transmissions of multimedia data via an internet-type network between a first subscriber system and a second subscriber system including:

at least one phase of signaling data exchange, via a signaling channel, using a predetermined signaling protocol, and a phase of exchanging said multimedia data via a data channel using a predetermined communication protocol;

wherein at least said first subscriber system includes a first terminal provided with a web-type navigator and a first smart card reader that cooperate via a first smart card, said first smart card including an instance of a first software layer forming a specific communication protocol layer, and said first terminal including an instance of a second software layer forming a specific communication protocol layer and forming an interface with at least said web-type navigator; said first and second types of software layers each further including at least a first autonomous software entity of a client-type and a second autonomous software entity of a server-type, said entities cooperating in such a way as to enable an establishment of bi-directional data exchange sessions between said first terminal and said first smart card;

wherein said first smart card offers the function of a client/web server for enabling an establishment of a bi-directional data exchange between said first terminal of said first subscriber system and said second subscriber system via said internet-type network; and wherein said first smart card further includes:

a filter comprising application software of predetermined functional characteristics which receives and/or sends protocol data units to and/or from said first and second autonomous software entities of said first software layer, said filter being under the control of said second autonomous software entity of said first software layer and cooperates with said first and second autonomous software entities of said first software layer to open a session with said first and second autonomous software entities of said second software layer in order to form a first proxy function and to control predetermined characteristics of data exchanges that pass between said first subscriber system and said second subscriber system via at least one of said signaling channels and/or data channels during said phases of exchanging signaling data and/or multimedia data.

2. The method of claim 1, characterized in that said first and second autonomous software entities comprise intelligent agents.

3. The method of claim 2, characterized in that each of said intelligent agents is assigned at least one of the following six properties:

"terminal": intelligent agent located in said terminal;
"card": intelligent agent located in said smart card;
"local": intelligent agent not communicating with said network;
"network": intelligent agent communicating with said network;
"client": intelligent agent which initializes one of said sessions; and
"server": intelligent agent which receives a request for one of said sessions.

4. The method of claim 3, wherein said first and second software layers each include a first and second intelligent agent wherein:

said first intelligent agent of said first software layer having assigned said properties of "card", "server", and "local";

said second intelligent agent of said first software layer having assigned said properties of "card", "client", and "local";

said first intelligent agent of said second software layer having assigned said properties of "terminal", "server", and "network";

said second intelligent agent of said second software layer having assigned said properties of "terminal", "client", and network"; and wherein said first intelligent agent of said first software layer is associated with said second intelligent agent of said second software layer via a session wherein predetermined functional characteristics of said filter are functions involving information originating in said second intelligent agent of said second software layer;

wherein said second intelligent agent of said second software layer performs the function of a server of the TCP/IP type;

wherein said first intelligent agent of said second software layer performs the function of a server of the TCP/IP or UDP/IP type for connection to said second subscriber system via said internet-type network; and wherein an instance of said second intelligent agent of said first software layer is dynamically created in each of said sessions by said filter, and said intelligent agent opening sessions with said first intelligent agent of said second software layer and transmitting an address enabling a connection to said second subscriber system in such a way that said intelligent agents and said filter cooperate to form said proxy TCP function and control said data exchange characteristics between said first subscriber system and said second subscriber system via said signaling channels and/or data channels.

5. The method of claim 1, wherein said proxy function controls said characteristics of said signaling data traveling on said signaling channel, that said terminal of said first subscriber system and said second subscriber system including a signaling layer of software assigned to a signaling port, designated by a predetermined port number, the method including at least the following steps:

establishing a bi-directional exchange session between said terminal of said first subscriber system, having associated therewith a caller subscriber, and said smart card with which said terminal is associated by using a server of the TCP type in such a way as to call said first smart card at a wrap-around URL address;

calling said second subscriber system or called party, by said first smart card via said internet-type network at a URL address comprising an address of the IP type designating a called subscriber at said second subscriber system, and said signaling port number; and transmitting said signaling data over said signaling channel through said first proxy function and via said internet-type network.

6. The method of claim 5, wherein said called subscriber system includes a second terminal in which an instance of said second software layer is implanted and cooperates with a second smart card into which an instance of said first software layer and application software of predetermined functional characteristics are implanted to form a second proxy function, the method including the following additional steps:

calling said second smart card of said second subscriber system by said first smart card of said first subscriber system; and communicating between said second smart card of the said terminal of said second subscriber system and said first terminal through said second proxy function associated with said second smart card.

7. The method of claim 5, wherein said control of predetermined characteristics of exchanges of said signaling data includes a step of simple or mutual authentication between said first subscriber system and second subscriber system, performed by said first and second proxy functions.

8. The method of claim 5, wherein said control of predetermined characteristics of exchanges of said signaling data includes a step of negotiating a reservation for a routing path to be taken by said signaling data during said signaling data exchange phase, performed by said first and second proxy functions.

9. The method of claim 5, wherein said method further includes:
   a listing phase for listing said subscribers in at least one directory server in accordance with a predetermined listing protocol; and subscriber profile data; and
   a locating phase for locating said called subscriber by consulting at least one of said directory servers in accordance with a predetermined locating protocol, said predetermined listing and locating protocols being assigned to one or more software applications, at least one of said applications being stored in at least the first smart card of said first subscriber system,
   wherein said first smart card includes at least a first software entity capable of interpreting a set of instructions and translating said set of instructions into a set of orders in such a way as to cooperate with said first software layer so that said first smart card will offer a gateway interface function or CGI; and
   wherein said first smart card including at least one of said sets of instructions associated with at least one of said applications;
   and wherein said listing and locating phase include at least the following steps:
   1) opening a first sequence of data exchanges between at least said first terminal and said first smart card for the transmission of a request for said web navigator to retrieve data enabling the selection and activation of one of said applications with a view to selecting one of said directory servers;
   2) opening a second sequence of data exchanges between said first smart card and said terminal in order to transmit said second sequence of data to said first terminal;
   3) opening a third sequence of data exchanges between said first terminal and said first smart card to transmit selection data and optional parameters, said selection data and optional parameters including a reference to one of said sets of instructions associated with said applications;
   4) interpretation of said set of instructions by using said CGI function and execution of said applications; and
   5) as a result of said execution, opening a fourth sequence of data exchanges between said first smart card and one of said directory servers for transmitting a request to perform a predetermined listing or locating operation.

10. The method of claim 9, wherein said multimedia data are telephonic data;
   wherein said set of instructions to be interpreted, associated with each of said applications comprises a script; and
   wherein said second software entity comprises a software module of an intelligent script translator agent-type that furnishes orders comprehensible to said applications.

11. The method of claim 9, wherein step 1) further includes sending an http request using an internet-type protocol by addressing a predetermined page in HTML language, said request containing said selection data and optional parameters, and said address being a wrap-around URL address for said first smart card.

12. The method of claim 9, wherein said applications include a first application associated with said protocol enabling the listing of one of said subscribers on a predetermined directory server;
   wherein said optional parameters comprise data that define a subscriber profile, including at least data known as identification data of said subscriber to be recorded;
   wherein said http request in said step 3) includes first data, indicating that the operation requested is said listing, and second data, making it possible by said application of the first type to develop an address of the URL type that is characteristic of said predetermined directory server; and
   wherein said data associated with said subscriber profile are transmitted, during said step 4), to said directory server, in such a way as to perform said listing of one of said subscribers, said listing including the determination of an IP-type address by association of an address of said directory server address and said identification data of said subscriber.

13. The method of claim 9, wherein said applications include a second type associated with said protocol making it possible to locate said called subscriber in said internet-type network, said called subscriber being listed on said predetermined directory server;
   wherein said listing includes at least data known as identification data for said called subscriber;
   wherein said http request of said step 3) includes first data indicating that said listing or locating operation requested is said locating operation, second data identifying said called subscriber to be located, and third data making it possible, by said application of the second type, to develop an address of the URL type that is characteristic of said predetermined directory server; and
   wherein data identifying said called subscriber or transmitted during said step 4) to said directory server is able to perform said phase of locating said called subscriber by looking for an IP address, by associating said identification data for said called subscriber, which are received by said directory server, with listing data stored in said directory server, and retransmitting said IP address to said first smart card in such a way as to enable said locating operation.

14. The method of claim 1, wherein said first proxy function controls said multimedia data traveling on said data channel, that said first terminal of said first subscriber system and said second subscriber system include a data exchange software, assigned to a port of the UDP or data type, designated by a predetermined port number, the method including at least the following steps:
   establishing of a bi-directional exchange session between said first terminal of said first subscriber system, and said first smart card with which said first terminal is associated, by using a UDP-type server, in such a way as to call said first smart card at a wrap-around URL address;

calling said second subscriber system by said first smart card via said internet-type network at a URL address comprising an address of the IP type, designating a called subscriber at said second subscriber system and said signaling port number; and transmitting said multimedia data over said data channel through said first proxy function and via said internet-type network.

15. The method of claim 14, wherein said second subscriber system includes a second terminal in which an instance of said second software layer is implanted and cooperates with a second smart card into which an instance of said first software layer and application software of predetermined functional characteristics are implanted to form a second proxy function, the method including the following additional steps:

calling said second smart card of said second subscriber system by said first smart card of said first subscriber system; and communicating between said second smart card of said second terminal of said second subscriber system and said first terminal through said second proxy associated with said second smart card.

16. A smart card intended to cooperate with a terminal provided with a smart card reader in such a way as to form a first subscriber system for managing transmissions of multimedia data via an internet-type network between said first subscriber system and a second subscriber system, said management including at least one phase of exchanging data called signaling data, via a signaling channel, with the aid of a predetermined signaling protocol, and a phase of exchanging said multimedia data via a data channel, with the aid of a predetermined communication protocol, characterized in that said smart card includes:

a first software layer forming a specific communication protocol layer, said first software layer including at least one first autonomous software entity, of the server-type, and a second autonomous software entity of the client-type, said software entities cooperating in such a way that said smart card offers the function of a client/webserver and so as to enable the establishment of data exchanges between said terminal of said first subscriber system and said second subscriber system via said internet-type network; and a filter for receiving and/or sending protocol data units from and/or to said first and second autonomous software entities;

wherein said filter is embodied under the control of said autonomous software entity of the server-type; and wherein said filter cooperates with said autonomous software entities of said first software layer to enable the opening of a session between said second software layer to form a proxy function and to control predetermined characteristics of the data exchanges traveling between said first subscriber system and said second subscriber system via at least one of said signaling channels and/or data channels during said phases of exchanging signaling data and/or multimedia data.

17. The smart card of claim 16 wherein said management of multimedia data transmissions further includes:

a phase of listing one or more subscribers in at least one directory server, in cooperation with a predetermined listing protocol and subscriber profile data; and a phase of locating a called subscriber by consulting at least one of said directory servers in cooperation with a predetermined locating protocol; and wherein said smart card stores one or more applications associated with said predetermined listing and locating protocols, and said smart card includes at least one software translator agent cooperating with said software layer so that said smart card will offer a gateway interface function or CGI, in such a way as to activate said applications associated with said listing or locating protocols.

* * * * *